(12) United States Patent
Woerner et al.

(10) Patent No.: US 9,284,939 B2
(45) Date of Patent: *Mar. 15, 2016

(54) LASER-INDUCED SPARK IGNITION FOR AN INTERNAL COMBUSTION ENGINE

(75) Inventors: Pascal Woerner, Korntal-Muenchingen (DE); Juergen Raimann, Weil Der Stadt (DE); Joerg Engelhardt, Ditzingen (Hirschlanden) (DE); Martin Weinrotter, Vitoria-Gasteiz (ES)

(73) Assignee: ROBERT BOSCH GMBH, Stuttgart (DE)

( * ) Notice: Subject to any disclaimer, the term of this patent is extended or adjusted under 35 U.S.C. 154(b) by 544 days.

This patent is subject to a terminal disclaimer.

(21) Appl. No.: 13/699,924

(22) PCT Filed: Apr. 5, 2011

(86) PCT No.: PCT/EP2011/055246
§ 371 (c)(1),
(2), (4) Date: Feb. 6, 2013

(87) PCT Pub. No.: WO2011/147623
PCT Pub. Date: Dec. 1, 2011

(65) Prior Publication Data
US 2013/0133602 A1 May 30, 2013

(30) Foreign Application Priority Data

May 27, 2010 (DE) .......................... 10 2010 029 398

(51) Int. Cl.
*F02P 23/04* (2006.01)
*F02B 17/00* (2006.01)
*F02B 23/10* (2006.01)

(52) U.S. Cl.
CPC ............... *F02P 23/04* (2013.01); *F02B 17/005* (2013.01); *F02B 23/105* (2013.01); *Y02T 10/125* (2013.01)

(58) Field of Classification Search
CPC .......... F02P 23/04; F02M 57/06; F02B 19/10
USPC ...................... 123/260, 285, 286, 143 B, 297
See application file for complete search history.

(56) References Cited

U.S. PATENT DOCUMENTS 7,770,552 B2 * 8/2010 Schultz ..................... 123/143 B
8,375,911 B2 * 2/2013 Weinrotter et al. ....... 123/143 B
(Continued)

FOREIGN PATENT DOCUMENTS

DE  10 2006 018 973  10/2007
DE  10 2008 018 482  10/2009
(Continued)

OTHER PUBLICATIONS

International Search Report, PCT International Application No. PCT/EP2011/055246, dated Aug. 18, 2011.

*Primary Examiner* — Hai Huynh
(74) *Attorney, Agent, or Firm* — Kenyon & Kenyon LLP

(57) ABSTRACT

A laser spark plug for an internal combustion engine includes at least one element for guiding, shaping and/or generating laser radiation, a combustion chamber window and a housing. The housing has, on the opposite side of the combustion chamber window from the element, an aperture for the passage of the laser radiation guided, shaped and/or generated by the element into a prechamber disposed at the end of the housing on the combustion chamber side. At least one overflow channel is provided for a fluid connection between an internal space of the prechamber and a combustion chamber surrounding the prechamber. When a fluid flows into the internal space of the prechamber through the overflow channel, a fluid flow is obtained that enters the interior of the aperture at a minimum angle ∈, in particular measured with respect to the longitudinal axis of the laser spark plug, of 45°.

22 Claims, 13 Drawing Sheets

(56) References Cited

U.S. PATENT DOCUMENTS

| | | | |
|---|---|---|---|
| 8,459,222 B2* | 6/2013 | Weinrotter et al. | 123/143 B |
| 8,701,613 B2* | 4/2014 | Herden et al. | 123/143 B |
| 8,844,491 B2* | 9/2014 | Weinrotter et al. | 123/143 B |
| 2009/0159031 A1 | 6/2009 | Gruber | |
| 2011/0120404 A1 | 5/2011 | Weinrotter et al. | |
| 2011/0308489 A1 | 12/2011 | Herden | |
| 2012/0037108 A1* | 2/2012 | Herden et al. | 123/143 B |
| 2013/0104827 A1* | 5/2013 | Woerner et al. | 123/143 B |
| 2013/0152893 A1* | 6/2013 | Woerner et al. | 123/143 B |
| 2013/0199483 A1* | 8/2013 | Herden et al. | 123/143 B |
| 2014/0130761 A1* | 5/2014 | Woerner et al. | 123/143 B |
| 2014/0165945 A1* | 6/2014 | Woerner et al. | 123/143 B |
| 2014/0305394 A1* | 10/2014 | Woerner et al. | 123/143 B |

FOREIGN PATENT DOCUMENTS

| | | | | |
|---|---|---|---|---|
| DE | 10 2009 000 956 | | 8/2010 | |
| DE | 10 2009 002 149 A1 * | 10/2010 | | F02P 23/04 |
| EP | 2 072 803 | | 6/2009 | |
| EP | 2 325 477 | | 5/2011 | |
| FR | 2 873 763 | | 2/2006 | |
| JP | 58-162773 | | 9/1983 | |
| JP | 9-250438 | | 9/1997 | |
| JP | 2006-329116 | | 12/2006 | |
| JP | 2006329116 | | 12/2006 | |
| WO | WO 2005/066488 | | 7/2005 | |
| WO | WO 2006/011950 | | 2/2006 | |
| WO | WO 2011/054610 A1 * | 5/2011 | | F02P 23/04 |

* cited by examiner

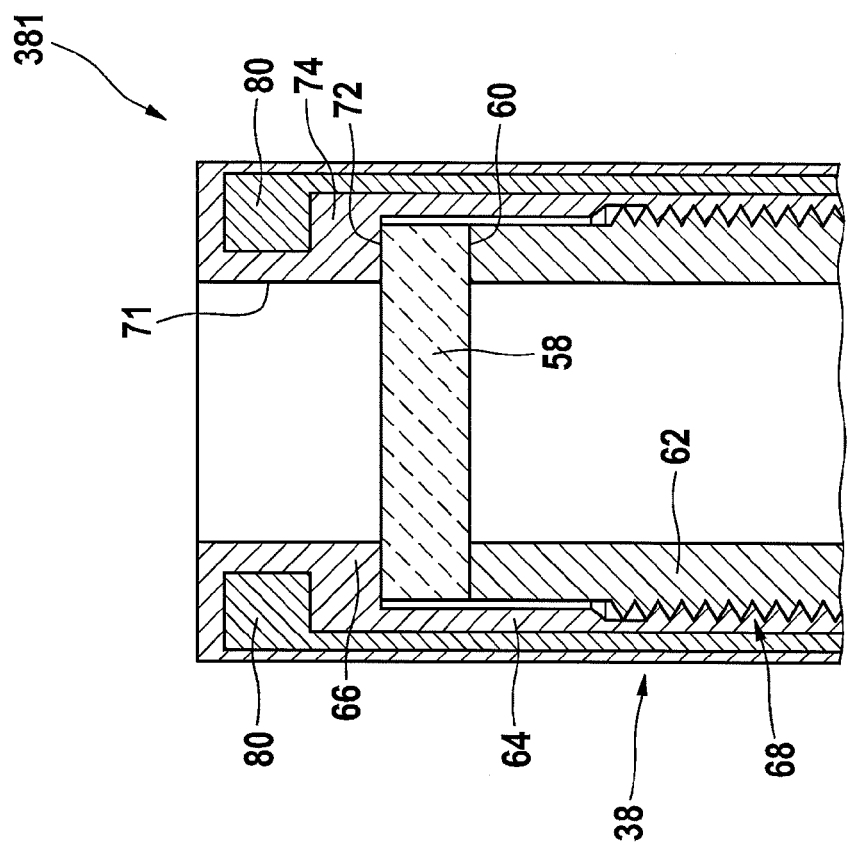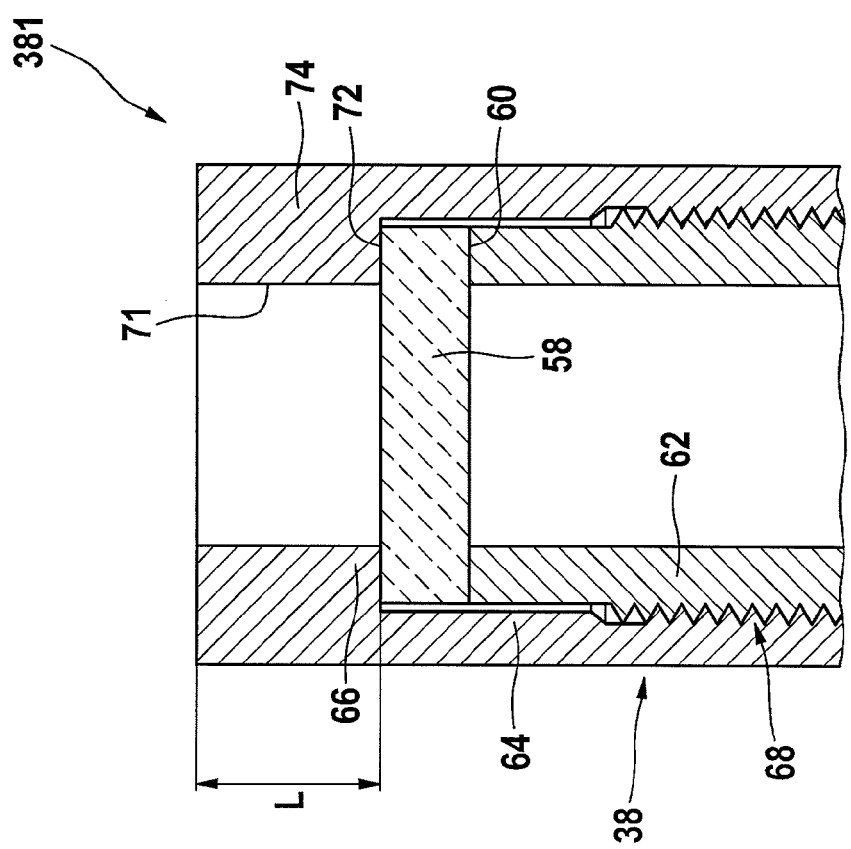

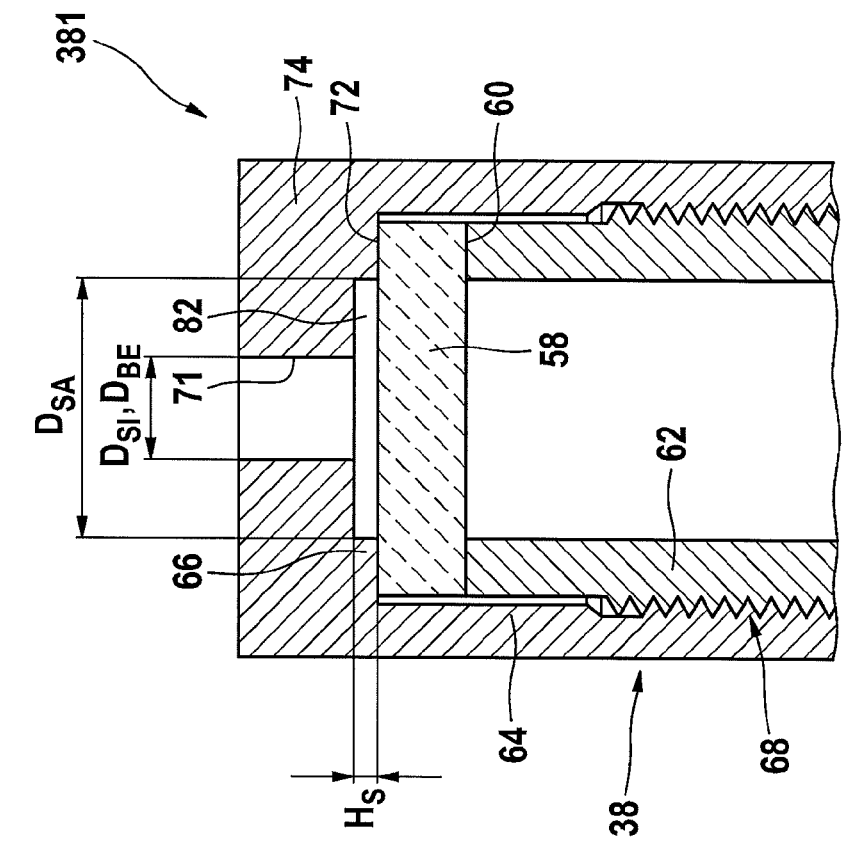
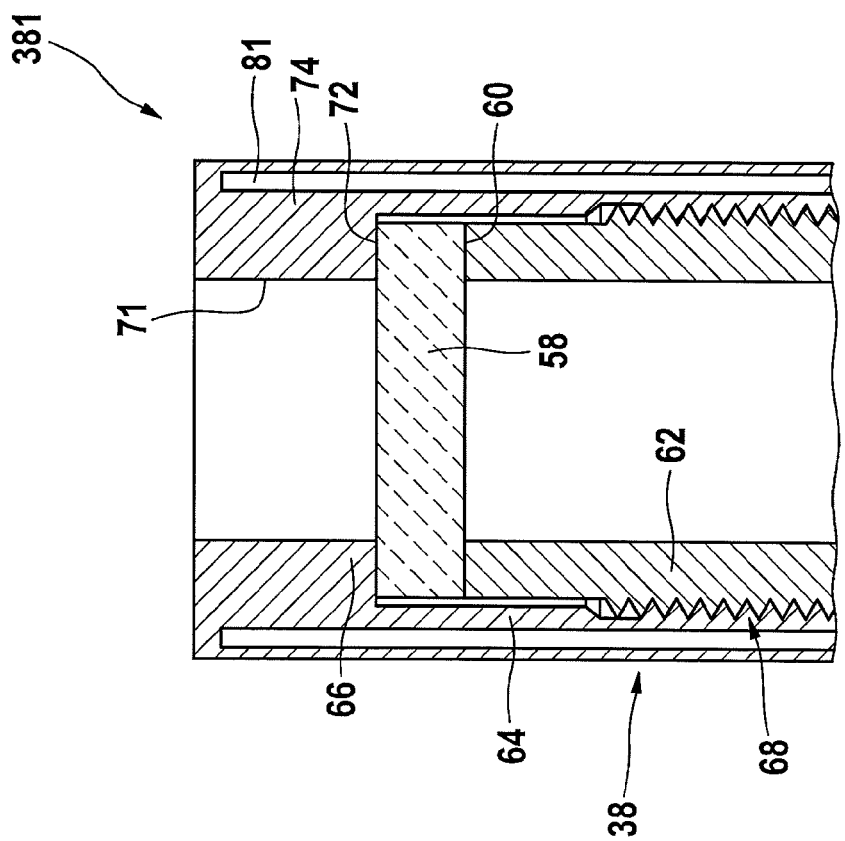
Fig. 5
Fig. 4

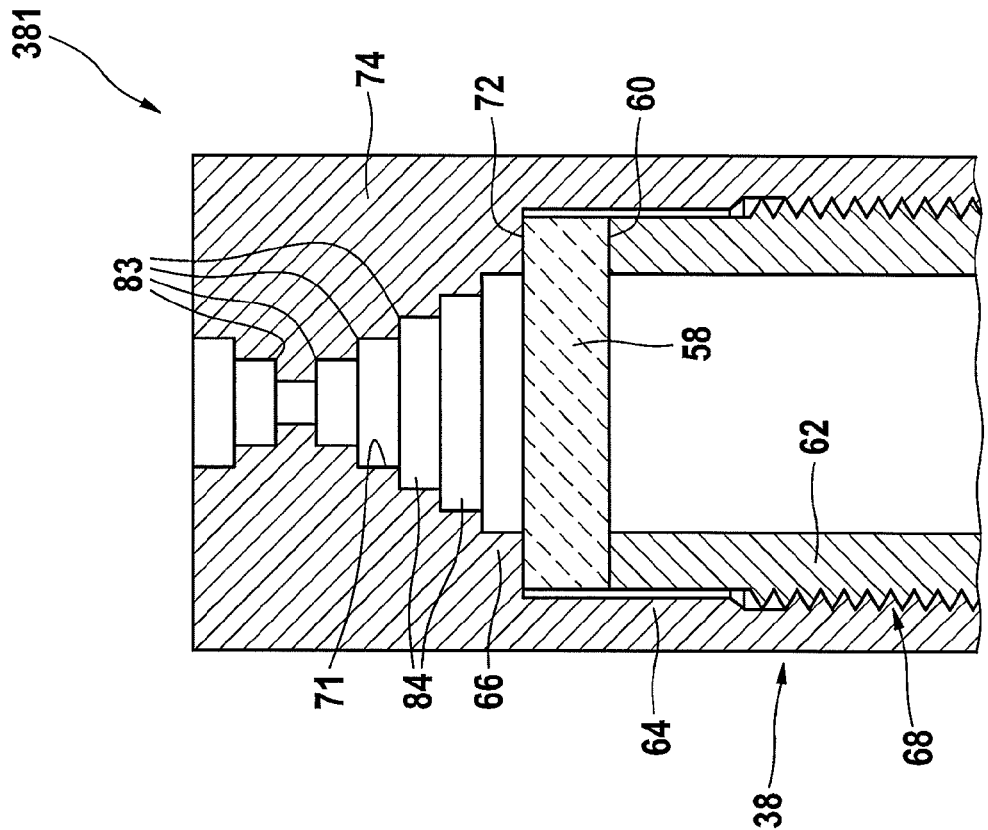
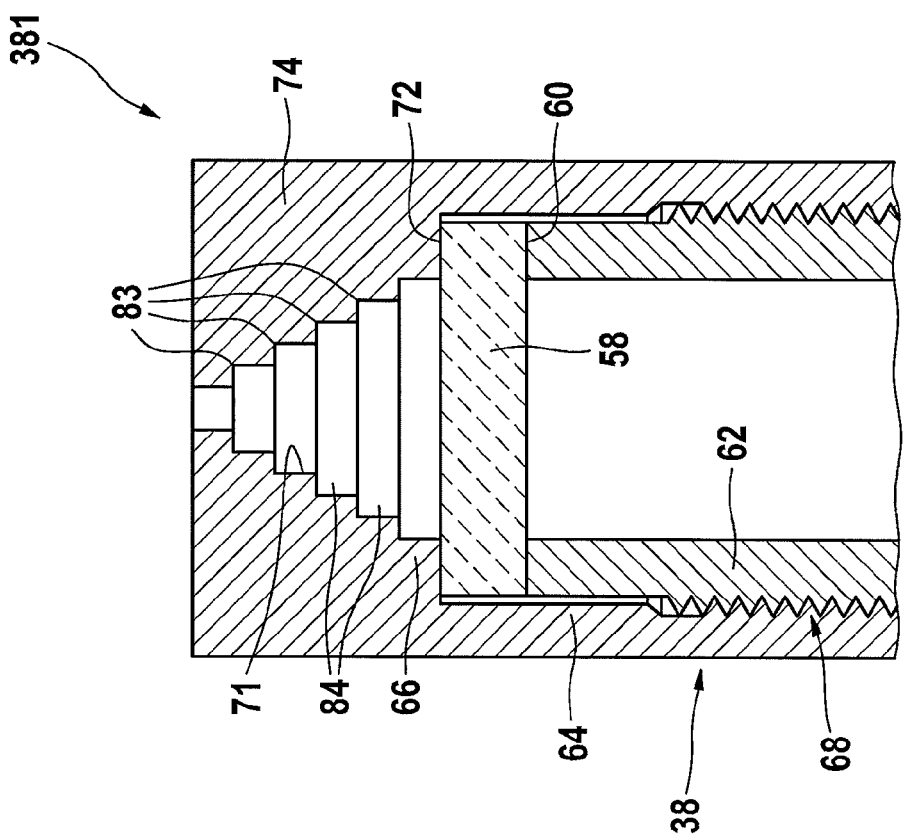
Fig. 9
Fig. 8

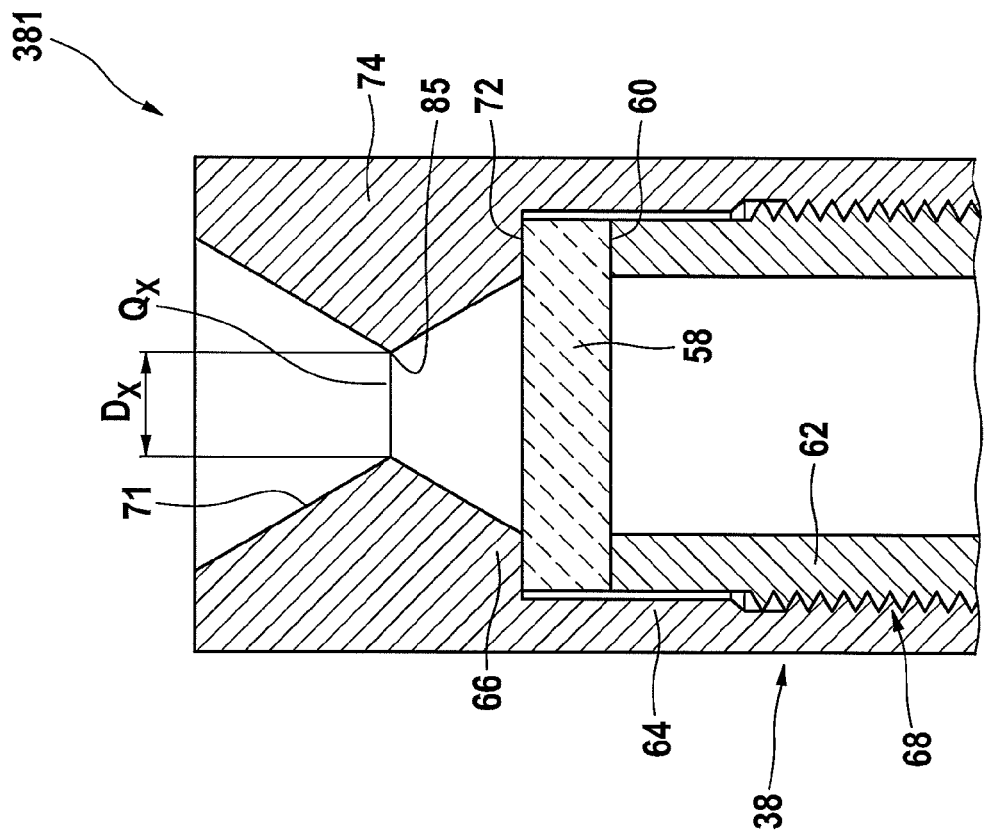
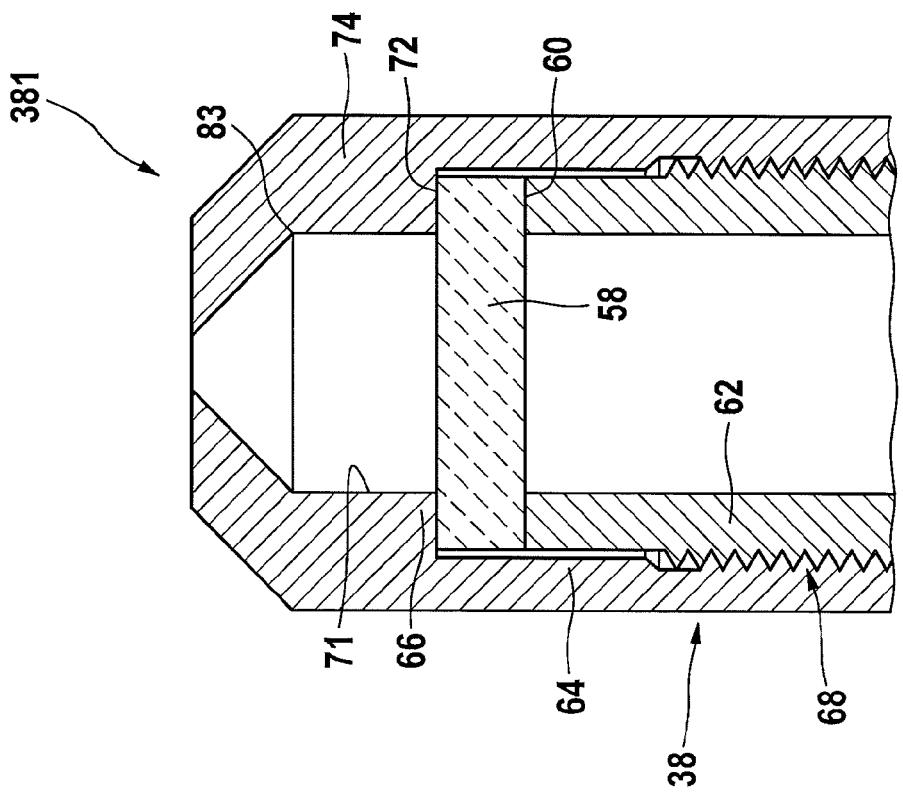
Fig. 11
Fig. 10

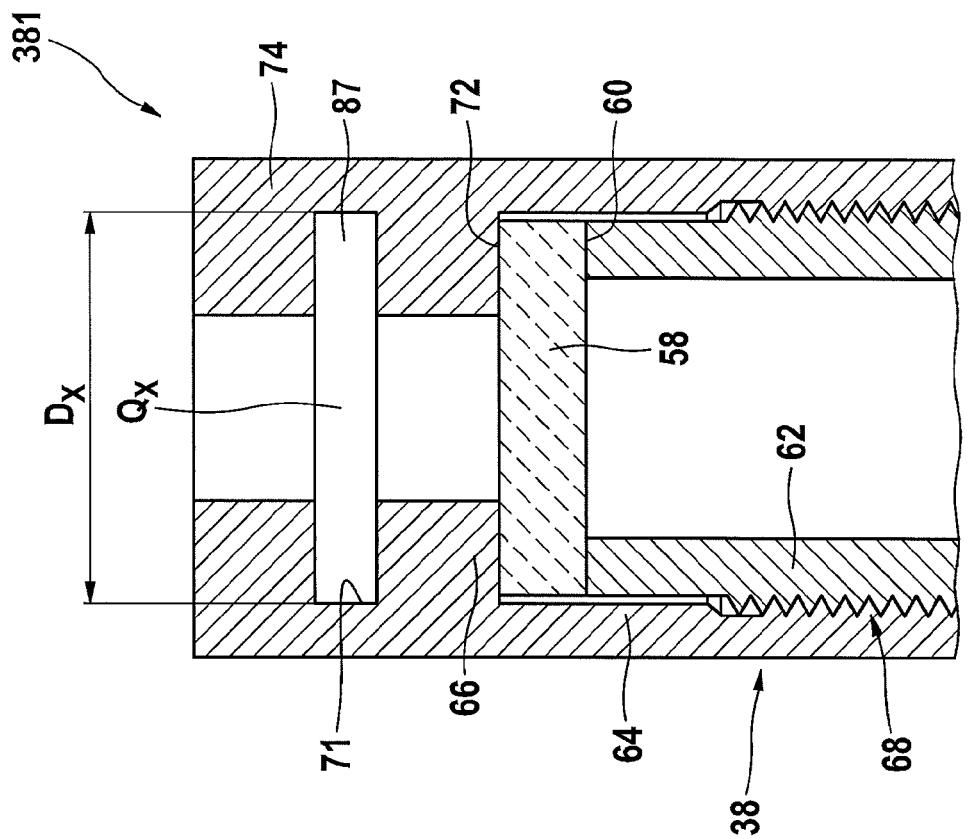
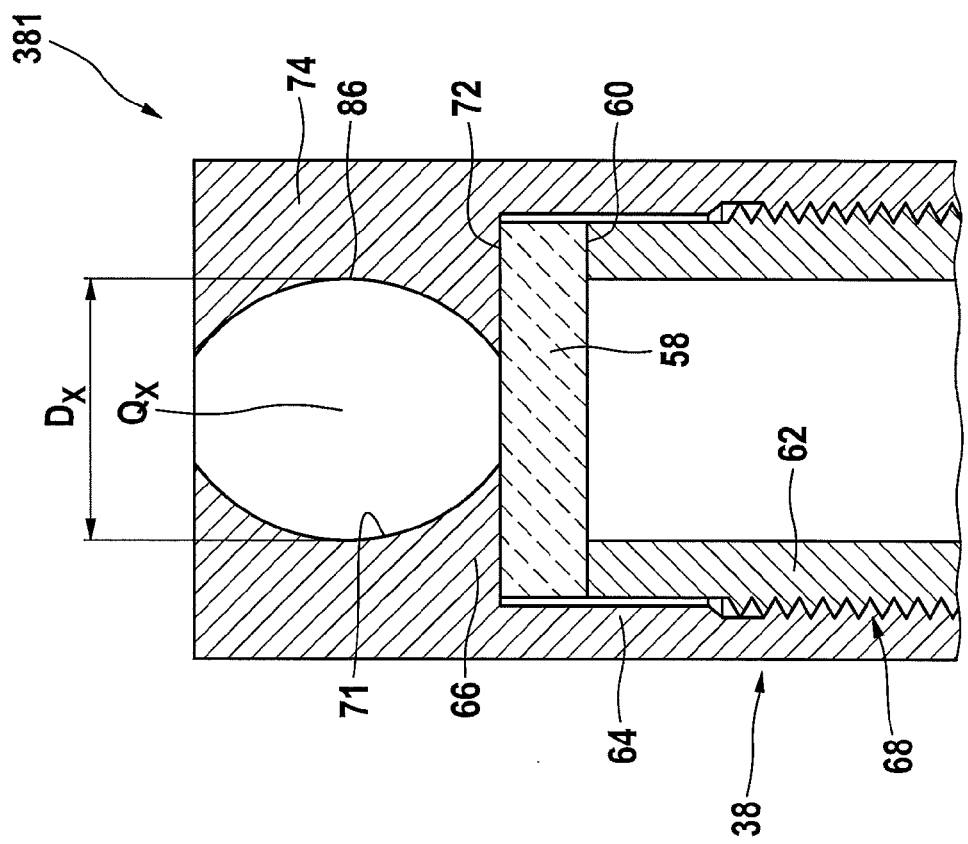

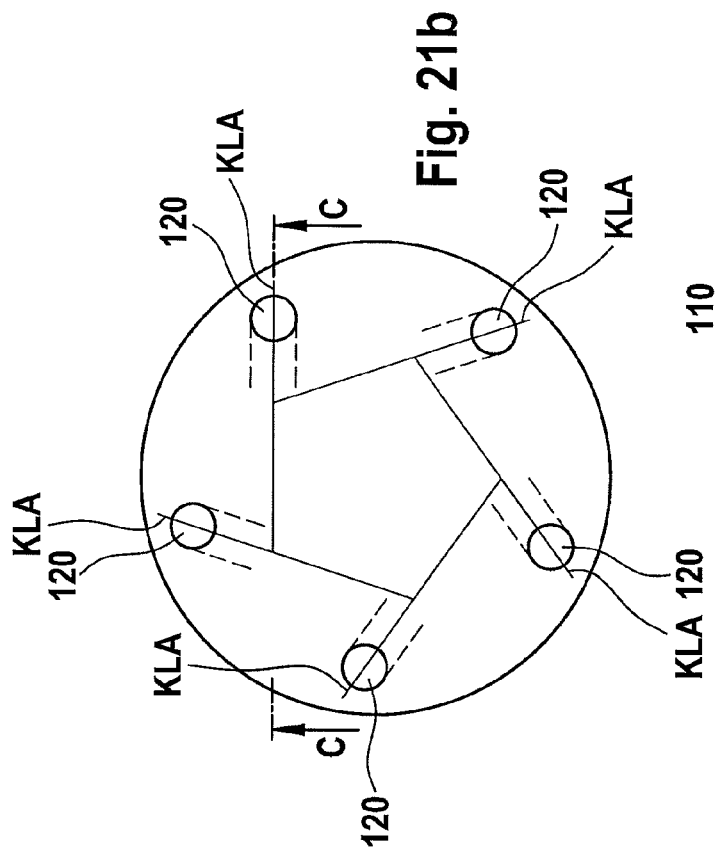
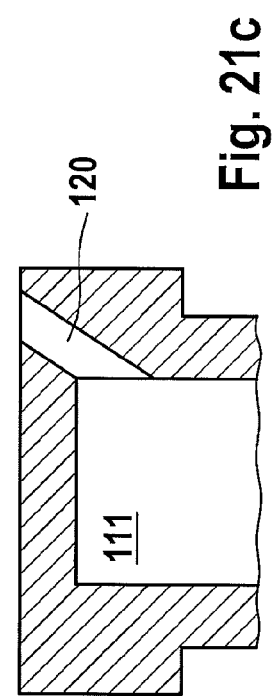
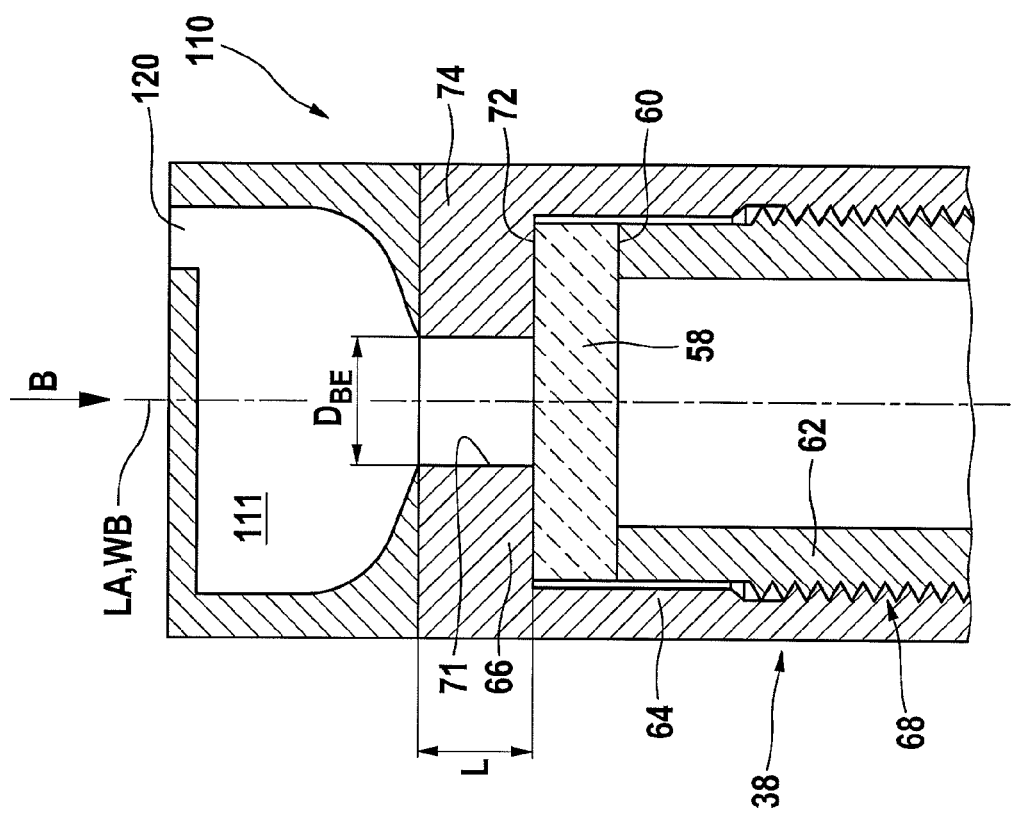

LASER-INDUCED SPARK IGNITION FOR AN INTERNAL COMBUSTION ENGINE

CROSS REFERENCE TO RELATED APPLICATIONS

The present application is the national stage entry of International Patent Application No. PCT/EP2011/055246, filed on Apr. 5, 2011, which claims priority to Application No. DE 10 2010 029 398.9, filed in the Federal Republic of Germany on May 27, 2010.

FIELD OF INVENTION

The present invention relates to a laser spark plug.

BACKGROUND INFORMATION

International Patent Publication No. WO 2005/066488 A1, for example, describes a device for ignition of an internal combustion engine, which device includes an ignition laser. The ignition laser has at the end thereof toward the combustion chamber a combustion chamber window which is transmissive for the laser pulses emitted by the ignition laser. At the same time, the combustion chamber window must withstand the high pressures and temperatures prevailing in the combustion chamber and must seal off the interior of the ignition laser from the combustion chamber. In that situation, high surface temperatures and pressures, and also soiling, for example in the form of oil ash deposits, particles, etc., may occur especially at the surface of the combustion chamber window facing the combustion chamber.

In the case of the known device, it is to be regarded as a disadvantage that certain constituents of exhaust gases, for example oil ashes or soot, damage the combustion chamber window, for example by being deposited on the combustion chamber window and impairing its properties, in particular transmission for laser radiation.

SUMMARY

The present invention, on the other hand, has the advantage of making operation of the laser spark plug more reliable. In particular, according to the present invention measures are taken to reduce deposits on the combustion chamber window. To that end, the present invention provides that a laser spark plug for an internal combustion engine includes at least one element for guiding, shaping and/or generating laser radiation, and includes a combustion chamber window and a housing, the housing having, on the opposite side of the combustion chamber window from the element, in particular at an end of the housing on the combustion chamber side, an aperture for the passage of the laser radiation guided, shaped and/or generated by the element into a combustion chamber. The aperture influences the conditions to which the combustion chamber window is exposed, so that the formation of deposits on the combustion chamber window is reduced and the reliability of the laser spark plug is altogether improved.

The element for guiding, shaping and/or generating laser radiation may, on the one hand, be a solid-state laser, for example a passively Q-switched solid-state laser which, for example, is of a monolithic design. Devices for optical excitation of the solid-state laser, especially semiconductor lasers, may be included in the laser spark plug. Alternatively, it is possible for devices for optical excitation of the solid-state laser to be disposed at a distance from the laser spark plug. In that case, the element for guiding, shaping and/or generating laser radiation may be an optical window or an optical fiber through which radiation serving to optically excite the solid-state laser is able to enter the laser spark plug. The arrangement of one or more solid-state lasers, especially Q-switched or mode-coupled solid-state lasers, at a distance from the laser spark plug is also possible. In that case, the emission thereof may be supplied to the laser spark plug in an optical fiber, for example, in which case the laser spark plug itself does not include a laser-active element, but merely includes beam-guiding and/or beam-shaping element, especially lenses and/or mirrors.

The housing ensures, in particular, the mountability of the laser spark plug on an internal combustion engine. For that purpose, securing elements known per se may be provided, such as screw-threads included in the housing, sealing and/or contact surfaces included in the housing, which are able to interact with further fastening elements, for example fastening lugs. The housing further has, in particular, the function of mechanically fixing the at least one element for guiding, shaping and/or generating laser radiation and the combustion chamber window.

The combustion chamber window is a transparent component consisting of at least one permanently heat-resistant and radiation-resistant solid body, for example a type of glass or crystal, for example sapphire. The combustion chamber window is, in particular, a component of the mentioned kind that, in the direction of the radiation, is the rearmost component included in the laser spark plug, so that the surface of the combustion chamber window facing the combustion chamber communicates with the combustion chamber.

To greatly reduce soiling of and/or damage to the side of the combustion chamber window exposed to the combustion chamber, which is caused by the conditions prevailing in the combustion chamber (high temperature, high pressure, high flow speed) and media (particles, oil ashes, etc.), the present invention provides that the housing has an aperture on the opposite side of the combustion chamber window from the element for guiding, shaping and/or generating laser radiation, that is, in particular, on the side of the combustion chamber window facing the combustion chamber. The combustion chamber window is thus disposed, in particular, between the element for guiding, shaping and/or generating laser radiation and the aperture. Preferably, the aperture forms an end portion of the housing on the combustion chamber side. It is possible, in particular, for the aperture to be formed in one piece with the housing of the laser spark plug and/or to be formed from the same material as the housing. Alternatively, the aperture is constructed as a separate component and is fastened, for example welded or screwed, to a further part of the housing. Further units included in the laser spark plug, for example flushed and/or non-flushed prechambers, are optionally disposed on the combustion chamber side of the aperture.

The aperture is, in particular, a structure having a passage, in particular exactly one passage. The side of the combustion chamber window facing the combustion chamber communicates with the combustion chamber and/or with a prechamber of the laser spark plug, which prechamber is disposed in front of the aperture, through the one passage in the aperture, especially exclusively through the one passage in the aperture. The passage is delimited radially with respect to the radiation direction by the internal contour of the aperture. The passage is moreover provided for the passage of the laser radiation guided, shaped and/or generated by the element into a combustion chamber of an internal combustion engine, into a prechamber of the combustion chamber and/or into a prechamber of the laser spark plug, which prechamber is disposed in front of the aperture.

The present invention is based on the concept that, by providing an aperture, or rather by suitable configuration of such an aperture, protection of the combustion chamber window is possible, especially protection of the combustion chamber window from conditions prevailing in a combustion chamber, in particular from high temperatures, high flow speeds and media such as oil ashes, etc.

The aperture provided in accordance with the invention on the one hand reduces the amount of contamination in the form of particles, oil ashes, etc. deposited on the combustion chamber window. On the other hand, the momentum with which, for example, the particles impinge on the surface of the combustion chamber window is reduced. The two effects each ensure that deposits on the combustion chamber window are distinctly reduced and that the few deposits adhere to the combustion chamber window less firmly. As a result, the laser ignition device according to the present invention is more reliable. A further effect of the aperture is that the temperature of the combustion chamber window is lowered. By virtue of the lowered temperature, a chemical reaction of the deposits, or rather a chemical reaction of the combustion chamber window with the deposits, a burning-in, as it were, of the deposits and hence lasting damage to the combustion chamber window, are avoided. Remaining deposits therefore adhere to the combustion chamber window less firmly and may be easily cleaned off. A reduction in the pressure at the combustion chamber window, or rather in the pressure variation rates occurring there, may also be brought about by the aperture according to the present invention, which may also result in greater reliability.

Further advantageous embodiments of the invention provide for the length of the aperture to be strategically selected. The length of the aperture is to be understood here as being, in particular, the length of the passage in the aperture in the beam direction. Alternatively, a longitudinal axis of the laser spark plug or a direction perpendicular to the surface of the combustion chamber window facing the combustion chamber may be taken as the basis. The length of the passage is further measured between the orifice that is toward the combustion chamber (also: exit orifice) and the orifice that is remote from the combustion chamber (also: entry orifice) of the aperture. In the case of apertures and passages having irregularly shaped orifices, with regard to their position attention is to be focused, in particular, on whether a lateral shielding of the portion coming into consideration as the passage is predominantly obtained. The avoidance of deposits on the combustion chamber window, in particular by flow diversion and by lowering the temperature of the combustion chamber window, takes place in the case of apertures whose length is 4 mm or more. Increasingly especially good results are obtained with apertures whose minimum length is 6 mm, 8 mm, 10 mm or 12 mm. The upper limit that comes into consideration for the length of the aperture is 25 mm, 20 mm or 15 mm. Even longer apertures could unduly increase the length and hence the space required for the installation of a laser spark plug.

In further advantageous embodiments of the invention, in addition or alternatively to a strategic selection of the length of the aperture, it is provided, in a laser spark plug for an internal combustion engine, including at least one element for guiding, shaping and/or generating laser radiation, further including a combustion chamber window and a housing, the housing having, on the opposite side of the combustion chamber window from the element, in particular at an end of the housing on the combustion chamber side, an aperture for the passage of the laser radiation guided, shaped and/or generated by the element into a combustion chamber, that the aperture, in particular a material of the aperture, is strategically so selected that it has a high thermal conductivity.

Preferably, the material of the aperture should also have a high resistance to wear, especially resistance to heat, as may be obtained, for example, with high-alloy steels.

The material of the entire aperture may be the same as that of the entire housing and have a high thermal conductivity. It is also possible, however, for only the entire aperture to be formed from a material having a high thermal conductivity while other components of the housing have a different, in particular lower, thermal conductivity. It is also possible for only parts of the aperture, for example parts of the aperture that are predominant on the basis of mass and/or volume and/or parts of the aperture that are on the inside, formed as "cores" as it were, to be formed from a material having a high thermal conductivity while other parts of the aperture have a different, in particular lower, thermal conductivity. With such an arrangement it is advantageously possible to adjust the desired thermal conduction and to obtain at the same time a high resistance to wear.

The avoidance of deposits on the combustion chamber window particularly by lowering the temperature of the combustion chamber window already occurs if the aperture has a material with a thermal conductivity of 60 W/(m*K) or more, in particular consists of such a material in its entirety or in portions. Increasingly especially good results are obtained with apertures that have a material with a thermal conductivity of 80 W/(m*K) or more or 120 W/(m*K) or more, in particular that consist of such a material. Materials that come into consideration are, in particular, brass and nickel and copper and alloys of brass and nickel and also copper alloys and, for parts of the aperture lying on the inside, formed as it were as "cores", especially copper.

A further measure for lowering the temperature of the combustion chamber window in a laser spark plug for an internal combustion engine, including at least one element for guiding, shaping and/or generating laser radiation, further including a combustion chamber window and a housing, the housing having, on the opposite side of the combustion chamber window from the element, in particular at an end of the housing on the combustion chamber side, an aperture for the passage of the laser radiation guided, shaped and/or generated by the element into a combustion chamber, is to provide in the interior of the aperture at least one cooling channel. The cooling channel is provided, in particular, for a cooling medium, for example a cooling fluid, to flow through it. The provision of a plurality of cooling channels and/or of a cooling channel diameter of 1 mm$^2$ or more and/or 5 mm$^2$ or less is preferred. Such a cooling channel is itself already suitable for lowering the temperature of the combustion chamber window. In cooperation with an aperture that has a material having a high thermal conductivity, the heat may be passed particularly well from the aperture to the cooling channel and thus may be removed from the aperture.

Both the strategic choice of the length of the aperture and the strategic choice of the material and/or the provision of cooling channels are suitable individually, but especially in cooperation, for bringing about the lowering of the temperature of the combustion chamber window; in particular, combinations of a stated feature relating to the length of the aperture with a stated feature relating to the heat conduction of the aperture are advantageous with regard to avoiding deposits on the combustion chamber window and hence with regard to the reliability of the laser spark plug. The lowering of the temperature of sealing locations disposed in the region of the combustion chamber window also improves the reliability of the laser spark plug.

In further advantageous embodiments of the invention, in addition or alternatively to the strategic selection of the length of the aperture and in addition or alternatively to the provision of a high thermal conductivity of the aperture, it is provided, in a laser spark plug for an internal combustion engine, including at least one element for guiding, shaping and/or generating laser radiation, further including a combustion chamber window and a housing, the housing having, on the opposite side of the combustion chamber window from the element, in particular at an end of the housing on the combustion chamber side, an aperture for the passage of the laser radiation guided, shaped and/or generated by the element into a combustion chamber, that a gap communicating with the interior of the aperture is provided in front of the combustion chamber window on the combustion chamber side, the height of which gap is strategically selected to be low.

A gap is to be understood here as being, in particular, a region of space that is axially delimited on both sides, in particular on one side by the combustion chamber window and on one side by the aperture, and that is radially delimited on the outside, in particular by the housing, and which communicates via its radial inner side with the interior of the aperture. More particularly, the gap is accordingly formed between the aperture and the combustion chamber window. The height of the gap is to be understood as meaning, in particular, the spacing of the surfaces axially delimiting the gap. In the case of irregular geometries, attention is to be focused on whether an axial delimitation of the gap is predominantly obtained.

This embodiment of the invention is based, on the one hand, on the realization that the temperature of a hot gas, in particular of a burning gas, entering the gap formed in accordance with the invention is greatly reduced. As a result, so-called quenching takes place, which is accompanied by extinguishing of the burning gas and formation of soot inside the gap. This embodiment of the invention is also based, on the other hand, on the realization that the soot so formed is also deposited on the side of the combustion chamber window facing the combustion chamber, but may be reliably ablated by laser radiation at intensities such as those usually occurring in the region of the combustion chamber window, so that, in total, the soot formation occurring in the gap results only in moderate impairment of the transparency of the combustion chamber window.

Surprisingly, it has been found that, by the continuous deposition and ablation of soot on the side of the combustion chamber window facing the combustion chamber, it is possible to avoid or considerably reduce the soiling of the side of the combustion chamber window facing the combustion chamber by other substances, especially by further combustion products, such as, for example, oil ashes. That fact is particularly important, since it is not possible or is possible only to some extent or with increased effort to reliably ablate such materials, especially oil ashes, by laser radiation at intensities such as those usually occurring in the region of the combustion chamber window.

The overall resulting avoidance of deposits on the combustion chamber window occurs for gap heights of at most 1 mm, at most 0.5 mm, at most 0.3 mm or at most 0.1 mm. As the lower limits for the height of the gap, 0.05 mm and 0.08 mm come into consideration. In gaps that are too shallow, it is not possible for soot to form sufficiently. It is moreover advantageous to place the gap directly in front of the combustion chamber window and/or to select a ring shape or a crescent shape for the base face of the gap.

The surface area of the base fade of the gap (hereinafter called "gap cross-section") is preferably selected to be sufficiently large so that the amount of gas entering is sufficient for adequate soot formation. It is increasingly advantageous in this case if a region in the interior of the aperture in front of the gap on the combustion chamber side has an entry cross-section of the aperture, and the gap cross-section is at least 10% of the entry cross-section, at least 30% of the entry cross-section or at least 50% of the entry cross-section or is at least twice as large as the entry cross-section or at least four times as large as the entry cross-section. The upper limits that come into consideration are gap cross-sections that are 25 times as large as the entry cross-section, especially 10 times as large as the entry cross-section, since the laser spark plug would otherwise become excessively large.

Both the strategic selection of the length of the aperture, the strategic selection of the material and/or the provision of cooling channels and the provision according to the present invention of a gap of the kind described above are already suitable each on their own for bringing about the lowering of the temperature in a volume disposed in front of the combustion chamber window. In particular, however, efficient cooling in that volume and hence the bringing about of quenching effects and soot formation takes place as a result of a cooperation of that gap with a long aperture and/or an aperture having good thermal conductivity, in which the volume enclosed by the gap is cooled especially effectively by the interaction with the combustion chamber window which has a relatively low temperature.

The above-described effect of soot formation, deposition and ablation is advantageous particularly when using laser spark plugs in internal combustion engines whose lubrication makes use of oils containing additives, especially high-additive oils, since, in particular, on combustion of such oils, oil ashes are produced which may otherwise be removed only with difficulty. On the other hand, consideration is also to be given to optimizing laser spark plugs for use in internal combustion engines whose lubrication makes use of non-additive oils, i.e., ash-free oils, by completely or largely dispensing with soot formation which is not necessary in that case. In that sense, in a laser spark plug for an internal combustion engine, including at least one element for guiding, shaping and/or generating laser radiation, further including a combustion chamber window and a housing, the housing having, on the opposite side of the combustion chamber window from the element, in particular at an end of the housing on the combustion chamber side, an aperture for the passage of the laser radiation guided, shaped and/or generated by the element into a combustion chamber, and a gap communicating with the interior of the aperture being provided in front of the combustion chamber window on the combustion chamber side, it would be necessary for the height of the gap to be strategically selected such that soot formation is completely or at least to a large extent avoided. For this, it is advantageous to select the height of the gap to be not less than 0.3 mm, especially not less than 1 mm. Soot formation may be avoided especially reliably if the gap is even higher, for example at least 2 mm or at least 3 mm high. The provision of a gap cross-section that is small in comparison with the entry cross-section of the aperture is also beneficial; in particular, it is advantageous for the gap cross-section to be not more than 100%, especially not more than 40%, preferably not more than 20%, of the entry cross-section of the aperture. In further advantageous embodiments of the present invention, in addition or alternatively to the strategic selection of the length of the aperture and in addition or alternatively to the provision of a high thermal conductivity of the aperture and in addition or alternatively to the provision of a gap disposed in front of the combustion chamber window on the combustion chamber side and communicating with the interior of the aperture, the height of which gap is strategically selected to be small, it is provided, in a laser spark plug for an internal combustion engine, including at least one element for guiding, shaping and/or generating laser radiation, further including a combustion chamber window and a housing, the housing having, on the opposite side of the combustion chamber window from the element, in particular at an end of the housing on the combustion chamber side, an aperture for the passage of the laser radiation guided, shaped and/or generated by the element into a combustion chamber, that the aperture has on the side thereof remote from the combustion chamber window a small orifice cross-section (also: "exit cross-section").

The exit cross-section of the aperture is, in particular, the open cross-section, on the combustion chamber side, of the passage in the aperture. In the case of passages having an irregularly shaped exit orifice, with regard to the exit cross-section attention is to be focused, in particular, on whether a lateral shielding of the portion coming into consideration as the passage is predominantly obtained.

The smallness of the exit cross-section of the aperture results in the advantageous effect that the combustion chamber window experiences shielding from the conditions prevailing in the combustion chamber, in particular from high temperature, rapid pressure fluctuations, high flow speed and/or particles of oil ashes, soot and the like. In that manner it is possible to avoid deposits on the combustion chamber window and improve the reliability of the laser spark plug. That effect occurs if the exit cross-section is 78 $mm^2$ or less, especially 19 $mm^2$ or less. Increasingly especially good results are obtained with exit cross-sections that are 7 $mm^2$ or less, especially 2 $mm^2$ or less. As lower limits, 0.05 $mm^2$, 0.4 $mm^2$ and 1 $mm^2$ come into consideration. Even smaller exit diameters may possibly not guarantee passage of the laser radiation through the aperture with sufficient reliability.

The strategic selection of the length of the aperture, the strategic selection of the material and/or the provision of cooling channels are already suitable, each on their own or in combinations with one another, for lowering the temperature of the combustion chamber window, so that a "burning-in" of contamination on the combustion chamber window is reduced and hence the reliability of the laser spark plug is increased. By providing a gap in front of the combustion chamber window on the combustion chamber side, it is possible to obtain a similar effect in the manner described above. If those measures are combined with the provision of a small exit cross-section of the aperture, the overall effect is that, on the one hand, fewer particles reach the combustion chamber window, but on the other hand the combustion chamber window is also more resistant to soiling by those remaining particles. The reliability of the laser spark plug may be considerably increased in that manner.

Advantageous embodiments provide, in addition or alternatively to the strategic selection of the length of the aperture and in addition or alternatively to the provision of a high thermal conductivity of the aperture and in addition or alternatively to the provision of a gap disposed in front of the combustion chamber window on the combustion chamber side and communicating with the interior of the aperture, the height of which gap is strategically selected to be small, and in addition or alternatively to the provision of a small exit cross-section of the aperture, that a laser spark plug for an internal combustion engine includes at least one element for guiding, shaping and/or generating laser radiation, and a combustion chamber window and a housing, the housing having, on the opposite side of the combustion chamber window from the element, in particular at an end of the housing on the combustion chamber side, an aperture, especially a cylindrical aperture, for the passage of the laser radiation guided, shaped and/or generated by the element into a combustion chamber, wherein the length of the aperture is L and the exit cross-section of the aperture is $Q_{BA}$ where $1 < L/(4Q_{BA}/\pi)^{1/2} \leq 10$.

That strategic matching of the length of the aperture to the orifice cross-section or orifice diameter of the aperture always ensures that excessive exposure of the combustion chamber window to stress caused by the effect of harmful conditions such as those prevailing in combustion chambers of internal combustion engines is avoided. It is important here that the overall effect of the length of the aperture and the orifice cross-section of the aperture is taken into consideration within the condition $1 < L/(4Q_{BA}/\pi)^{1/2} \leq 10$. This is based on the realization that even relatively short apertures are able to exhibit the advantages according to the invention provided that the orifice cross-section of those apertures is small in the extent defined. On the other hand, apertures having a relatively large orifice cross-section may still exhibit a sufficient shielding effect provided that the aperture has a great length. The stated technical effect occurs especially when $2 \leq L/(4Q_{BA}/\pi)^{1/2}$ and/or $L/(4Q_{BA}/\pi)^{1/2} \leq 7$, especially $L/(4Q_{BA}/\pi)^{1/2} \leq 6$. In the special case of a round exit cross-section of the aperture, the quantity $(4Q_{BA}/\pi)^{1/2}$ represents the exit diameter of the aperture.

In advantageous embodiments of the invention, in addition or alternatively to the strategic selection of the length of the aperture and in addition or alternatively to the provision of a high thermal conductivity of the aperture and in addition or alternatively to the provision of a gap disposed in front of the combustion chamber window on the combustion chamber side and communicating with the interior of the aperture, the height of which gap is strategically selected to be small, and in addition or alternatively to the provision of a small exit cross-section of the aperture, it is provided, in a laser spark plug for an internal combustion engine, including at least one element for guiding, shaping and/or generating laser radiation, further including a combustion chamber window and a housing, the housing having, on the opposite side of the combustion chamber window from the element, in particular at an end of the housing on the combustion chamber side, an aperture for the passage of the laser radiation guided, shaped and/or generated by the element into a combustion chamber, that the internal contour of the aperture has, in a region that is spaced both from the end of the aperture toward the combustion chamber and from the end of the aperture remote from the combustion chamber, at least one edge, especially a plurality of edges.

An edge of the internal contour of the aperture is to be understood here as meaning, in particular, a geometric object, especially a line at which various planar regions of the internal contour of the aperture meet at an angle other than zero. A region of the internal contour of the aperture, which region is spaced both from the end of the aperture toward the combustion chamber and from the end of the aperture remote from the combustion chamber is to be understood as being a central region of the internal contour of the aperture, especially a region that is central with respect to the longitudinal extent of the aperture. A region is central with respect to the longitudinal extent of the aperture especially when it is disposed between a front fifth and a rear fifth of the aperture, especially between a front quarter and a rear quarter of the aperture, or in a central third of the aperture. An internal contour having an edge in a region is to be understood as meaning that at least parts of the edge are disposed in that region, it also being possible for the edge to be disposed in, but, in addition, also outside of that region. As an advantageous special case, it may also always be provided that the edge lies completely in the region.

The technical effect of an edge of the kind described is that it forms an origin for a disturbance of the inflow of gases into the aperture or of the flow in the aperture. In particular, starting at the edge, a swirling of the gas flowing into the aperture or of the gas flowing in the aperture may occur. As a result of the disturbance, in particular as a result of the swirling, the interaction of the gas flowing into the aperture with the internal contour of the aperture is increased and, as a result of this increased interaction, the tendency of particles present in the gas to be deposited inside the aperture and specifically at the edges and not to penetrate as far as the combustion chamber window is also increased. In that manner, the edge takes on, as it were, the action of a particle trap. Thus, a reduction in the deposits on the combustion chamber window occurs and an increased reliability of the laser spark plug is obtained.

Although the described effect is already obtained by providing a single edge of the kind described, especially advantageous developments provide for the provision of a plurality of such edges. A plurality of edges is two or more edges, especially more than two edges. The arrangement of one edge or a plurality of edges is particularly effective when it lies exposed opposite the combustion chamber window, at least along parts of the edge and/or of the combustion chamber window, that is to say, without parts of the aperture being disposed between the parts of the edge and the parts of the combustion chamber window. In that case, the edge is particularly suitable for imparting a disturbance or a swirling motion to the parts of the flow penetrating into the aperture or of the flow in the aperture that are mainly directed onto the combustion chamber window.

An especially advantageous arrangement of the edge or the plurality of edges is one such that, as a result of the arrangement of the edge or as a result of the arrangement of the plurality of edges, steps are formed and/or the internal contour of the aperture tapers stepwise, at least in regions, in the direction toward the end thereof that is toward the combustion chamber. It is possible to provide, in particular, at least two, especially at least three, preferably at least four steps. In addition, it is possible to provide at least one further step, in particular a plurality of further steps, at which the aperture tapers in the direction toward the end thereof that is remote from the combustion chamber. A step of the internal contour is understood here as being, in particular, an arrangement of at least three partial surfaces of the internal contour, one of the partial surfaces being disposed between the two other partial surfaces, in the longitudinal direction of the internal contour, and the radial inclination of the one partial surface in relation to the radial inclinations of all three of the partial surfaces being extremal. The partial surfaces may, in particular, have a ring-shaped configuration, but other geometries are also possible in principle.

In a variant that is advantageous in terms of production engineering, the steps are almost right-angled (88°-92°), especially are right-angled, that is to say, in particular, the two partial surfaces extend parallel to a longitudinal axis of the laser spark plug whereas the one partial surface is oriented perpendicularly thereto. In particular, a plurality of such steps, for example more than three or more than seven, may be provided. Steps consisting of surfaces that always or in some cases meet at obtuse angles or always or in some cases meet at acute angles, but preferably not at angles more acute than 25° in this case, are also conceivable and, in different kinds in each case, also advantageous. Combinations of steps of the mentioned kinds are in principle also possible in an aperture.

Both the provision of a small exit cross-section of the aperture and the provision of at least one edge in a region that is spaced both from the end of the aperture toward the combustion chamber and from the end of the aperture remote from the combustion chamber make it possible, each individually, to reduce the number of particles that impinge on the combustion chamber window. If the two measures are combined with each other, this produces the synergistic effect that the flow into the aperture, which flow has been spatially concentrated by the small exit cross-section of the aperture, may be disturbed by suitable edges in an especially well-directed manner, in particular may be swirled. Advantageous exit cross-sections in this case are, in particular, exit cross-sections of 78 $mm^2$ or less, especially 19 $mm^2$ or less, preferably 7 $mm^2$ or less, especially preferably 2 $mm^2$ or less, it being possible for each of those exit diameters to be advantageously combined with a step-shaped internal contour of the aperture, especially with a step-shaped internal contour of the aperture having a plurality of steps, especially right-angled steps, especially steps at which the cross-sectional area of the aperture increases in each case in the direction from that end of the internal contour of the aperture which is toward the combustion chamber to that end of the internal contour of the aperture which is remote from the combustion chamber by at least 10%, especially by at least 35%.

The strategic selection of the length of the aperture, the strategic selection of the material and/or the provision of cooling channels are already suitable, each on their own or in combinations with one another, for lowering the temperature of the combustion chamber window, so that a "burning-in" of particles on the combustion chamber window is reduced, deposits are reduced and hence the reliability of the laser spark plug is increased. By providing a gap disposed in front of the combustion chamber window on the combustion chamber side, it is possible to achieve a similar effect. If those measures are combined with the provision of at least one edge in a region that is spaced both from the end of the aperture toward the combustion chamber and from the end of the aperture remote from the combustion chamber, the overall effect obtained is that, on the one hand, fewer particles reach the combustion chamber window, but on the other hand the combustion chamber window is also more resistant to soiling by those few particles. The reliability of the laser spark plug may be considerably increased in that manner.

In advantageous embodiments of the invention, in addition or alternatively to the strategic selection of the length of the aperture and in addition or alternatively to the provision of a high thermal conductivity of the aperture and in addition or alternatively to the provision of a gap disposed in front of the combustion chamber window on the combustion chamber side and communicating with the interior of the aperture, the height of which gap is strategically selected to be small, and in addition or alternatively to the provision of a small exit cross-section of the aperture and in addition or alternatively to the provision of an edge of the kind described, it is provided, in a laser spark plug for an internal combustion engine, including at least one element for guiding, shaping and/or generating laser radiation, further including a combustion chamber window and a housing, the housing having, on the opposite side of the combustion chamber window from the element, in particular at an end of the housing on the combustion chamber side, an aperture for the passage of the laser radiation guided, shaped and/or generated by the element into a combustion chamber, the aperture having an end that is toward the combustion chamber and an end that is remote from the combustion chamber, that the internal contour of the aperture has, in a region that is spaced both from the end of the aperture toward the combustion chamber and from the end of the aperture remote from the combustion chamber, an extremal cross-section.

An extremal cross-section of the internal contour of an aperture is to be understood, in particular, as being a cross-section that in relation to its surface area and in relation to the longitudinal direction of the laser spark plug represents a local maximum, that is to say, in particular, becomes smaller in both longitudinal directions, or represents a local minimum, that is to say, in particular, becomes larger in both longitudinal directions. The extremal cross-section of the aperture in a region that is spaced both from the end of the aperture toward the combustion chamber and from the end of the aperture remote from the combustion chamber may manifest itself, in particular, in providing a cross-section of the aperture that is larger than the entry cross-section of the aperture and larger than the exit cross-section of the aperture, or in providing a cross-section of the aperture that is smaller than the entry cross-section of the aperture and smaller than the exit cross-section of the aperture. In particular, the extremal cross-section is a cross-section lying in a plane that is parallel to a plane in which the exit cross-section of the aperture lies and/or lying in a plane that is parallel to a plane in which the entry cross-section of the aperture lies and/or that is parallel to a plane in which the surface of the combustion chamber window facing the combustion chamber lies and/or that is oriented perpendicularly to a longitudinal axis of the laser spark plug.

The technical effect of the measure of the internal contour of the aperture having an extremal cross-section in a region that is spaced both from the end of the aperture toward the combustion chamber and from the end of the aperture remote from the combustion chamber is that the region of extremal cross-section forms an origin for a disturbance of the inflow of gases into the aperture or for a disturbance of the flow in the aperture. In particular, starting at the region of extremal cross-section, a swirling of the exhaust gas flowing into the aperture or of the flow in the aperture may occur. As a result of the disturbance, in particular as a result of the swirling, the interaction of the exhaust gas flowing into the aperture with the internal contour of the aperture is increased and, as a result of this increased interaction, the tendency of particles present in the exhaust gas to be deposited inside the aperture and not to penetrate as far as the combustion chamber window is also increased. In that manner, the region of extremal cross-section takes on, as it were, the action of a particle trap.

Although the described effect is already obtained simply by the provision of a region that is spaced both from the end of the aperture toward the combustion chamber and from the end of the aperture remote from the combustion chamber and that has an extremal cross-section, refinements provide that the aperture has an entry cross-section at the end thereof toward the combustion chamber and has an exit cross-section at the end thereof toward the combustion chamber, and that the extremal cross-section is either at least 10%, especially at least 20%, preferably at least 30%, smaller than the entry cross-section and at least 10%, especially at least 20%, preferably at least 30%, smaller than the exit cross-section or is at least 10%, especially at least 20%, preferably at least 30%, larger than the entry cross-section and at least 10%, especially at least 20%, preferably at least 30%, larger than the exit cross-section. An advantageous shape of the internal contour of the aperture provides that the internal contour of the aperture has two portions, each of which has a frustoconical shape, in particular each of which has the shape of a straight circular conical frustum, those two portions preferably being directly adjacent to each other, that is, abutting each other with their larger end face or with their smaller end face and thus forming, as it were, a double conical frustum. At the location where the conical frusta abut on each other, an edge is thus formed which extends either along a constriction or along a protrusion of the internal contour of the aperture.

In addition to rotationally symmetrical internal contours of the aperture, which, in particular, provide geometric features that extend all the way around, such as constrictions and/or protrusions, and/or provide a relief groove, it is in principle possible and advantageous to deviate from a rotationally symmetrical shape of the internal contour of the aperture in a laser spark plug for an internal combustion engine, including at least one element for guiding, shaping and/or generating laser radiation, further including a combustion chamber window and a housing, the housing having, on the opposite side of the combustion chamber window from the element, in particular at an end of the housing on the combustion chamber side, an aperture for the passage of the laser radiation guided, shaped and/or generated by the element into a combustion chamber. Such asymmetries have the effect that an increased interaction of the exhaust gas flowing into the aperture with the internal contour of the aperture occurs and, as a result of that increased interaction, the tendency of particles present in the exhaust gas to be deposited inside the aperture and not to penetrate as far as the combustion chamber window is also increased. The deposits on the combustion chamber window are thus reduced and the reliability of the laser spark plug is increased. Specific internal contours having a non-rotationally symmetrical shape have at least one recess, especially a plurality of recesses, which, in particular, are spaced both from the end of the aperture toward the combustion chamber and from the end of the aperture remote from the combustion chamber. A convexity, especially a plurality of convexities, which, in particular, are spaced both from the end of the aperture toward the combustion chamber and from the end of the aperture remote from the combustion chamber, are also advantageous, since the recess and/or the convexity forms an origin for a disturbance of the inflow of exhaust gases into the aperture. In particular, starting at the recess and/or convexity, a swirling of the gas flowing into the aperture may occur. Especially advantageously, the convexity and/or the recess is situated in a region of the aperture that is spaced both from the end of the aperture toward the combustion chamber and from the end of the aperture remote from the combustion chamber and that has an extremal cross-section. The provision of other internal contours of the aperture, in particular those that are optimized in terms of a flow, for example that are not sharp-edged, but rounded and/or completely or in portions in the form of a de Laval nozzle, is also conceivable in principle. In a region of the internal contour of the aperture that is spaced both from the end of the aperture toward the combustion chamber and from the end of the aperture remote from the combustion chamber, both the provision of one or more edges and the provision of extremal cross-sections and/or recesses and/or convexities, as described above, already have the effect, each individually, that a disturbance of the inflow of gases into the aperture is produced and that, in particular, a swirling of the gas flowing into the aperture occurs. This technical effect occurs to a greater extent in the case of an aperture having a plurality of the mentioned features.

The strategic selection of the length of the aperture, the strategic selection of the material and/or the provision of cooling channels are already suitable, each individually or in combinations with one another, for lowering the temperature of the combustion chamber window, so that deposits on the combustion chamber window are reduced and hence the reliability of the laser spark plug is increased. By the provision of a gap of the kind described above, disposed in front of the combustion chamber window on the combustion chamber side, it is possible, as described above, to achieve a similar effect by that measure alone and especially in combinations. If those measures are combined with the provision of an extremal cross-section in a region that is spaced both from the end of the aperture toward the combustion chamber and from the end of the aperture remote from the combustion chamber, the overall effect is that fewer particles reach the combustion chamber window, but on the other hand the combustion chamber window is also more resistant to soiling by those remaining particles. The lifetime of the laser spark plug may be considerably increased in that manner.

In further advantageous embodiments of the invention, in addition or alternatively to the strategic selection of the length of the aperture and in addition or alternatively to the provision of a high thermal conductivity of the aperture and in addition or alternatively to the provision of a gap disposed in front of the combustion chamber window on the combustion chamber side and communicating with the interior of the aperture, the height of which gap is strategically selected to be small, and in addition or alternatively to the provision of a small exit cross-section of the aperture and in addition or alternatively to the provision of an edge and/or of an extremal cross-section of the kind respectively described, it is provided, in a laser spark plug for an internal combustion engine, including at least one element for guiding, shaping and/or generating laser radiation, further including a combustion chamber window and a housing, the housing having, on the opposite side of the combustion chamber window from the element, in particular at an end of the housing on the combustion chamber side, an aperture for the passage of the laser radiation guided, shaped and/or generated by the element into a combustion chamber, that the laser spark plug has at least one focusing element for determining a beam shape of the laser radiation passing through the aperture, and the spacing between aperture and laser radiation, at least along predominant portions of the internal contour of the aperture, does not exceed a maximum spacing.

The at least one focusing element may be a focusing lens system, for example one lens or a plurality of lenses and/or may be one or more mirrors, especially one or more mirrors each with a curved surface. The construction of the combustion chamber window and/or the construction of the element for guiding, shaping and/or generating laser radiation in the form of a focusing element is also possible in addition or as an alternative. The provision of the at least one focusing element fundamentally determines a beam shape of the laser radiation passing through the aperture. In the case of laser spark plugs in which the beam shape of the laser radiation passing through the aperture depends on a further operating parameter of the laser spark plug, for example a current or a temperature, the beam shape determined by the focusing element is to be regarded as the beam shape provided by the laser spark plug when the operating parameter assumes a value intended for the operation of the laser spark plug. The beam shape of the laser radiation, especially beam position, beam dimensions and spacings between beam and aperture are understood as being in accordance with or based on the DIN EN ISO 11145 standard.

Providing that the spacing between aperture and laser radiation does not exceed a maximum spacing at least along predominant portions of the internal contour of the aperture is based, on the one hand, on the realization that, in order to achieve a shielding effect for the combustion chamber window and in order to reduce deposits on the combustion chamber window, along predominant portions of the internal contour of the aperture, especially along the entire internal contour of the aperture, it is conducive if the passage in the aperture is as narrow as is at all possible. On the other hand, this conflicts with the requirement that a greatest possible proportion of the laser radiation guided, shaped and/or generated by the element for guiding, shaping and/or generating laser radiation is to pass through the aperture, that is, the aperture must not be too narrow, particularly since manufacturing tolerances also have to be taken into consideration.

A good compromise between those two requirements is already achieved if there is indeed a spacing between aperture and laser radiation along predominant portions of the internal contour of the aperture, but that spacing does not exceed a maximum spacing of 4 mm. Even better compromises provide that the maximum spacing along predominant portions of the internal contour of the aperture is 2 mm, especially 1 mm, preferably 0.55 mm, and/or that the spacing along the predominant portions of the internal contour of the aperture is not less than a minimum spacing which is advantageously 0.1 mm, 0.25 mm or 0.45 mm. The predominant portions of the internal contour of the aperture may include 70% of the surface area of the internal contour or more, 90% of the surface area of the internal contour or more or even the entire internal contour.

Instead of being expressed by geometric measurements based on the aperture and/or on the laser radiation, the fact that a good compromise has been found between the mentioned requirements may also be expressed in the proportion of laser radiation passing through the aperture. For example, it is advantageous if that proportion is from 50% to 100%, especially from 70% to 95%, and preferably from 85% to 93%, the remaining proportion being, in particular, absorbed and/or diffusely scattered by the aperture. In particular, the remaining proportion is no longer available for focusing of the laser beam.

The provision of minimum and/or maximum spacings in the manner described and further measures described above, in particular the provision of a small exit cross-section of the aperture, and the provision of the described ratios between exit cross-section and length of the aperture and/or adaptation of the internal contour of the aperture to the laser beam already make it possible, each individually, to obtain good shielding of the combustion chamber window from conditions prevailing in the combustion chamber. Cooperation of those measures makes it possible for the shielding effect to be considerably increased still further. Altogether, in that manner, deposits on the combustion chamber window may be especially effectively reduced and the reliability of the laser spark plug may be considerably increased.

The provision of minimum and/or maximum spacings in the manner described also enters into mutually potentiating relationship with the further measures described above or below that bring about a lowering of the combustion chamber window temperature and/or a reduction in the exposure of the combustion chamber window to particles, in particular the strategic selection of the length of the aperture, the strategic selection of the material and/or the provision of cooling channels and/or of a gap in the manner described, so that altogether a considerable increase in the reliability of the laser spark plug results.

In further advantageous embodiments of the invention, in addition or alternatively to the strategic selection of the length of the aperture and in addition or alternatively to the provision of a high thermal conductivity of the aperture and in addition or alternatively to the provision of a gap disposed in front of the combustion chamber window on the combustion chamber side and communicating with the interior of the aperture, the height of which gap is strategically selected to be small, and in addition or alternatively to the provision of a small exit cross-section of the aperture and in addition or alternatively to the provision of an edge and/or of an extremal cross-section of the kind respectively described, it is provided, in a laser spark plug for an internal combustion engine, including at least one element for guiding, shaping and/or generating laser radiation, further including a combustion chamber window and a housing, the housing having, on the opposite side of the combustion chamber window from the element, in particular at an end of the housing on the combustion chamber side, an aperture for the passage of the laser radiation guided, shaped and/or generated by the element into a combustion chamber, the internal contour of the aperture having the shape of the lateral surface of a conical frustum, the conical frustum having an opening angle $\phi$, that focusing elements are provided for determining a beam divergence angle $\psi$ of the laser radiation passing through the aperture, where $0 \leq \phi - \psi \leq 30°$, especially $0 < \phi - \psi < 30°$.

The beam shape of the laser radiation, in particular the beam divergence angle, beam position, beam dimensions and spacings between beam and aperture are understood as being in accordance with and/or or based on the DIN EN ISO 11145 standard. Regarding the configuration and effect of the focusing element, the foregoing remarks apply.

The feature that $0 \leq \phi - \psi \leq 30°$, especially $0 < \phi - \psi < 30°$, results in the technical effect that an exit cross-section of the aperture is relatively narrow, with the result that only few particles are able to enter the interior of the aperture, but the aperture widens relatively greatly in the portion thereof toward the combustion chamber window, as a result of which the planar extent of the internal contour of the aperture is relatively large. On the other hand, owing to the smaller beam divergence angle $\psi$, the surface area of the combustion chamber window penetrated by the laser radiation is relatively small. Those surface ratios result overall in the effect that the majority of particles that have penetrated into the aperture, which were few in number in the first place, become deposited on the aperture and not on the combustion chamber window. The deposits on the combustion chamber window are thus reduced and the reliability of the laser spark plug is increased.

That advantageous effect is particularly apparent when the internal contour of the aperture has the shape of the lateral surface of a straight circular conical frustum, the straight circular conical frustum having the opening angle $\phi$, where $0 \leq \phi - \psi \leq 30°$, especially $0 < \phi - \psi < 30°$. It is further preferred that the opening angle $\phi$ is 90° or less, especially 70° or less, preferably 60° or less and/or that the opening angle $\phi$ is 3° or more, especially 10° or more and/or $5° \leq \phi - \psi$, especially $13° \leq \phi - \psi$ and/or that $\phi - \psi \leq 20°$, especially $\phi - \psi \leq 15°$.

The selection of $\phi - \psi$ in the manner described and further measures described above, in particular the provision of a small exit cross-section of the aperture, and the provision of the described ratios between exit cross-section and length of the aperture and/or adaptation of internal contour of the aperture to the laser beam already make it possible, each individually, to obtain good shielding of the combustion chamber window from conditions prevailing in the combustion chamber. Cooperation of those measures makes it possible for the shielding effect to be considerably increased still further, so that altogether a considerable reduction in deposits and a considerable increase in the reliability of the laser spark plug results.

The suitable selection of $\phi - \psi$ in the manner described also enters into mutually potentiating relationship with further measures described above or below that bring about a lowering of the combustion chamber window temperature and/or a reduction in the exposure of the combustion chamber window to particles, in particular the strategic selection of the length of the aperture, the strategic selection of the material and/or the provision of cooling channels and/or of a gap in the manner described, so that altogether a considerable reduction in deposits and a considerable increase in the reliability of the laser spark plug results.

Advantageous further embodiments of the invention, especially refinements of the embodiments described above, relate to measures for guiding the flow in a region in front of the aperture and/or in the region of the aperture and/or in a region of the exit orifice of the aperture and/or in the aperture. Those measures may, on the one hand, relate to a prechamber included in the laser spark plug, in particular a prechamber disposed at the end of the housing on the combustion chamber side, and in that case relate, in particular, to the strategic arrangement of at least one overflow channel which makes possible a fluid connection between an internal space of the prechamber and a combustion chamber surrounding the prechamber. On the other hand, measures for influencing the flow in the regions mentioned may also be provided in devices not included in the laser spark plug, for example by the design of the shape of the combustion chamber or of the piston belonging to the combustion chamber or of other components of the internal combustion engine.

In accordance with the present invention, in addition or alternatively to the measures listed above, it is provided, in a laser spark plug for an internal combustion engine, including at least one element for guiding, shaping and/or generating laser radiation, further including a combustion chamber window and a housing, the housing having, on the opposite side of the combustion chamber window from the element, an aperture for the passage of the laser radiation guided, shaped and/or generated by the element into a prechamber disposed at the end of the housing on the combustion chamber side, at least one overflow channel being provided which makes possible a fluid connection between an internal space of the prechamber and a combustion chamber surrounding the prechamber, that the at least one overflow channel is so disposed and configured that, when a fluid flows into the internal space of the prechamber through the overflow channel, a desired fluid flow is obtained.

To that end, it may be provided that the at least one overflow channel has a cross-section that is not greater, and especially is smaller, than the exit cross-section of the aperture and/or is not greater, and especially is smaller, than a minimum cross-section of the aperture. In addition or alternatively, it may be provided that the at least one overflow channel has a cross-section $Q_{\ddot{U}}$ that is not greater, and especially is smaller, than a maximum cross-section, where the maximum cross-section may be 10 mm$^2$, 6 mm$^2$, 4 mm$^2$, 2 mm$^2$ or 1 mm$^2$. With those relatively small cross-sections it is possible to influence the direction of the fluid flowing into the prechamber in a particularly well-directed manner. In addition or alternatively to the strategic influencing of the fluid flowing into the prechamber, it is further conducive if the length of the at least one overflow channel $L_{\ddot{U}}$ is high in comparison with a cross-section $Q_{\ddot{U}}$ of the at least one overflow channel, especially in compliance with $L_{\ddot{U}} > (Q_{\ddot{U}}/\pi)^{1/2}$, $L_{\ddot{U}} > (16*Q_{\ddot{U}}/\pi)^{1/2}$ or in compliance with $L_{\ddot{U}} > (36*Q_{\ddot{U}}/\pi)^{1/2}$. The strategic influencing of the fluid flowing into the prechamber, in particular in one of ways mentioned below, results in a reduction in deposits on the combustion chamber window and hence in an improvement in the reliability of the laser spark plug.

The aperture may be regarded in this case as being, in particular, a cylindrical region of the laser spark plug or a region of the laser spark plug tapering toward the combustion chamber, which region lies between prechamber and combustion chamber window, while the prechamber may be regarded as being, in particular, a region of the laser spark plug disposed on the combustion chamber side of the aperture and having, in particular, at least in portions, an enlarged cross-section relative to the entire aperture or to the exit orifice of the aperture.

In accordance with the present invention, in a laser spark plug for an internal combustion engine, including at least one element for guiding, shaping and/or generating laser radiation, further including a combustion chamber window and a housing, the housing having, on the opposite side of the combustion chamber window from the element, an aperture for the passage of the laser radiation guided, shaped and/or generated by the element into a prechamber disposed at the end of the housing on the combustion chamber side, at least one overflow channel being provided which makes possible a fluid connection between an internal space of the prechamber and a combustion chamber surrounding the prechamber, the at least one overflow channel is so disposed and configured that, when a fluid flows into the internal space of the prechamber through the overflow channel, a fluid flow is obtained that enters the interior of the aperture at a finite minimum angle, in particular measured with respect to the longitudinal axis of the laser spark plug.

The fact that, when a fluid flows into the internal space of the prechamber through the overflow channel, a fluid flow is obtained that enters the interior of the aperture at a finite minimum angle $\epsilon$, in particular measured with respect to the longitudinal axis of the laser spark plug, results on the one hand in the effect that the inflowing fluid is directed onto the internal contour of the aperture and particles present in the fluid are deposited there. The number of particles that reach the combustion chamber window may thus be reduced, the deposits on the combustion chamber window are reduced and the reliability of the laser spark plug is increased.

The described effect already occurs when the minimum angle is 45°; even more advantageous minimum angles $\epsilon$ are 60° or 75° or 85°, each measured, in particular, with respect to the longitudinal axis of the laser spark plug. Alternatively, measurement of the minimum angle is also always possible with respect to a perpendicular to the entry face of the aperture and/or with respect to a perpendicular to a surface of the combustion chamber window facing the combustion chamber. In order to obtain that flow, it is preferably provided that the at least one overflow channel is so disposed that its longitudinal axis includes in the radial direction with the longitudinal axis of the laser spark plug an angle that is less than approximately 25°, preferably less than approximately 10°. Alternatively or in addition, it may be provided that a plurality of overflow channels is provided. In addition or alternatively, it may be provided that additional elements are provided, through which a flushing gas may be blown into the prechamber and that those elements are especially so disposed and so operable that, together with the fluid flowing in through the overflow bore, a resultant total flow results that enters the interior of the aperture at the minimum angle, as described above, or that is at least largely parallel to an exit orifice of the aperture. It is always preferred for the flow within the prechamber to be in the form of a tumbling flow.

The above-described effect of the provision of the minimum angle $\epsilon$ has, at a given minimum angle $\epsilon$, a synergistic effect with an especially long aperture and/or with an especially slim aperture, especially an aperture having a small exit cross-section $Q_{BA}$ through which the fluid flow enters the interior of the aperture, since, in such refinements, the internal contour of the aperture is impinged on by the fluid flow particularly close to its end on the combustion chamber side and particles are preferentially deposited there on the internal contour of the aperture. It is preferred for the internal contour of the aperture to be impinged on by the fluid flow in a half of the internal contour of the aperture that is toward the combustion chamber. Even more advantageous is impingement of the fluid flow in an end portion toward the combustion chamber, whose length in the longitudinal direction of the internal contour constitutes 1/n of the total length of the internal contour of the aperture, where n=3 or n=4 or n=5 is possible. A similar situation may also be expressed in the minimum angle $\epsilon$, the length of the aperture L, the ratio number n, and the exit cross-section of the aperture $Q_{BA}$ satisfying one of the following conditions:

$$n^* \tan \epsilon = L/(QA/\pi)^{1/2}; n=2 \ldots 5.$$

The measures according to the present invention of the housing having, on the opposite side of the combustion chamber window from the element, an aperture for the passage of the laser radiation guided, shaped and/or generated by the element into a prechamber disposed at the end of the housing on the combustion chamber side, at least one overflow channel being provided which makes possible a fluid connection between an internal space of the prechamber and a combustion chamber surrounding the prechamber, and of the at least one overflow channel being so disposed and configured that, when a fluid flows into the internal space of the prechamber through the overflow channel, a fluid flow is obtained that enters the interior of the aperture at a finite minimum angle, in particular measured with respect to the longitudinal axis of the laser spark plug, and the refinements of the invention pertaining thereto come into consideration, in particular optionally, for all embodiments and examples of the invention, even when not explicitly mentioned.

The provision of a minimum angle in the manner described also enters into mutually potentiating relationship with the further measures described above or below that bring about a lowering of the combustion chamber window temperature and/or a reduction in the exposure of the combustion chamber window to particles, in particular the strategic selection of the length of the aperture, the strategic selection of the material and/or the provision of cooling channels and/or of a gap in the manner described, so that altogether a considerable reduction in deposits and an increase in the reliability of the laser spark plug results.

Particularly advantageously, in a laser spark plug for an internal combustion engine, including at least one element for guiding, shaping and/or generating laser radiation, further including a combustion chamber window and a housing, the housing having, on the opposite side of the combustion chamber window from the element, in particular at an end of the housing on the combustion chamber side, an aperture for the passage of the laser radiation guided, shaped and/or generated by the element into a prechamber disposed at the end of the housing on the combustion chamber side, at least one overflow channel being provided which makes possible a fluid connection between an internal space of the prechamber and a combustion chamber surrounding the prechamber, the at least one overflow channel is so disposed and configured that, when a fluid flows into the internal space of the prechamber through the overflow channel, a fluid flow is obtained that has, in the region of the aperture, at least one vortex rotating about a vortex axis that has a component in the direction of the longitudinal axis of the laser spark plug.

The region of the aperture is to be regarded here as being, in particular, a region disposed in front of the aperture and/or a region of the exit orifice of the aperture. Regions are to be understood as being, in particular, spatial areas having structural lengths that are slightly smaller than, for example half the size of or a quarter the size of, a structural length of the internal contour of the aperture, where the structural length may be given, in particular, by the length, entry diameter and/or exit diameter of the aperture.

Such an arrangement and configuration of the overflow channel or of the flow channels results firstly in the fluid flow having, in the region of the aperture, a component in a direction perpendicular to the longitudinal axis LA of the laser spark plug. In addition, owing to the vortex, there results locally a flow diversion into a direction perpendicular to the local flow speed. Since the particles transported by the flow have a finite inertia, they follow that flow diversion only to a limited extent and have a tendency, especially in the case of a sharp flow diversion, to impinge on the internal contour of the aperture or on a side wall of the prechamber. The overall result is that the amount of particles reaching the combustion chamber window is reduced, with the result that deposits on the combustion chamber window are reduced and the reliability of the laser spark plug is increased.

Although the described technical effect is already obtained if the vortex axis has only one component in the direction of the longitudinal axis of the laser spark plug, it is preferred that the vortex axis includes with a longitudinal axis of the laser spark plug an angle of not more than 45°, especially not more than 20°, preferably not more than 10°, or is parallel to the longitudinal axis LA of the laser spark plug. In the case where the vortex axis is parallel to the longitudinal axis LA of the laser spark plug, apart from the coaxial arrangement, a spaced arrangement of vortex axis and longitudinal axis LA of the laser spark plug is also advantageous, especially when the spacing between vortex axis and longitudinal axis LA of the laser spark plug is at least 2 mm, especially at least 4 mm. Maximum spacings that come into consideration are 6 and 10 mm. The result of the spacing is a shear flow perpendicular to the exit orifice of the aperture and impingement of the particles on the internal contour of the aperture.

The provided arrangement of the overflow channel may, in particular, result from its longitudinal axis including in a tangential direction with the longitudinal axis of the laser spark plug an angle that is more than approximately 10°, preferably more than approximately 25°.

In addition or alternatively, it may be provided that additional elements are provided, through which a flushing gas may be blown into the prechamber, the additional elements being so disposed and being so operable that, together with the fluid flowing in through the overflow bore, a resultant total flow results that forms a vortex as described above. It is always preferred that the flow within the prechamber is in the form of a swirling flow.

The above-described effect of the provision of a vortex has, for a given vortex, a synergistic effect with an especially long aperture and/or with an aperture of an especially slim geometry, especially an aperture having a small exit cross-section $Q_{BA}$ through which the fluid flow enters the interior of the aperture, since, in such refinements, the tangentially flung particles impinge on the internal contour of the aperture particularly close to its end on the combustion chamber side. It is preferred that the internal contour of the aperture is impinged on by the tangentially flung particles in a half of the internal contour of the aperture that is toward the combustion chamber. Even more advantageous is impingement of the tangentially flung particles in an end portion toward the combustion chamber, whose length in the longitudinal direction of the internal contour constitutes 1/n of the total length of the internal contour of the aperture, where n=3 or n=4 or n=5 is possible.

A similar situation may also be expressed in the maximum angle v, which the vortex axis forms with the longitudinal axis of the laser spark plug, the length of the aperture L, the ratio number n, and the exit cross-section of the aperture $Q_{BA}$ satisfying one of the following conditions:

$$n^{*}\tan v = L/(QA/\pi)^{1/2}; n=2 \ldots 5.$$

The arrangement and configuration of an overflow channel in the manner indicated also enters into mutually potentiating relationship with the further measures described above or below that bring about a lowering of the combustion chamber window temperature and/or a reduction in the exposure of the combustion chamber window to particles, in particular the strategic selection of the length of the aperture, the strategic selection of the material and/or the provision of cooling channels and/or of a gap in the manner described, so that altogether a considerable reduction in deposits and a considerable increase in the reliability of the laser spark plug result.

Particularly advantageously, in a laser spark plug for an internal combustion engine, including at least one element for guiding, shaping and/or generating laser radiation, further including a combustion chamber window and a housing, the housing having, on the opposite side of the combustion chamber window from the element, in particular at an end of the housing on the combustion chamber side, an aperture for the passage of the laser radiation guided, shaped and/or generated by the element into a combustion chamber, the aperture has, on a side toward the combustion chamber, at least one external edge the contour of which deviates inward in comparison with a sharp-edged external edge.

Regarding the term "sharp edge", reference is made to the DIN ISO 13715:2000 standard. In particular, an external edge is regarded as being sharp-edged if it merely has undercuts or passings that are 50 µm or less.

The external edge of the aperture may, in particular, delimit the internal contour of the aperture. On the other hand, the external edge of the aperture may, in particular, also be spaced from the internal contour of the aperture, in particular may represent a radially outside boundary of the aperture and/or of the housing at its end on the combustion chamber side.

The provision of the inward deviation of the contour of the external edge is based on the realization that, when operated in an internal combustion engine, laser spark plugs are subjected on the combustion chamber side to the high temperatures that prevail in the interior of the combustion chamber. By thermal coupling of the laser spark plug on its side remote from the combustion chamber, on the other hand, a flowing away of heat takes place, with the result that the rise in the temperature of the laser spark plug is restricted. It has been recognized that the outflow of heat particularly from sharp external edges disposed on the combustion chamber side in the region of the laser spark plug is impaired and, as a consequence, particularly high temperatures occur in those regions, which may lead to the occurrence of glow ignitions in the combustion chamber and hence to impaired operation of the internal combustion engine. Owing to the inward deviation of the contour of the external edge, regions of such high temperature increases are avoided and, as a consequence, it is possible to avoid the occurrence of glow ignitions in the combustion chamber.

Although the described technical effect is already obtained if the aperture has, on a side toward the combustion chamber, at least one external edge whose contour deviates inward in comparison with a sharp-edged external edge, it is preferred that the external edge originates from a sharp-edged external edge by removal of more than 0.075 mm, especially 0.1 mm or more, preferably 0.15 mm or more. As upper limits for the removal there come into consideration 5 mm, 2 mm and 0.5 mm, since excessive removal could adversely affect the mechanical stability of the aperture.

In preferred embodiments, it is provided that the external edge of the aperture exhibits rounding and/or chamfering. In this regard it is further preferred that, in the case of rounding, the rounding radius, and, in the case of chamfering, the depth and/or the width of the chamfer, is 0.075 mm or more, especially 0.15 mm or more. In addition or alternatively, it is preferred that, in the case of rounding, the rounding radius, and, in the case of chamfering, the depth and/or width of the chamfer, is 5 mm or less, especially 2 mm or less, preferably 0.5 mm or less. Chamfer angles in the range from 20° to 70°, especially in the range from 40° to 50°, are preferred.

Particular importance is attached to the provision of the inward deviation of the contour of the external edge, especially the rounding and/or chamfering, in the case of apertures that have a great length, since those apertures are particularly exposed to the combustion chamber and therefore are particularly susceptible to an excessive increase in temperature. Such an excessive increase in temperature may be avoided particularly effectively if the aperture consists, at least in the region of the external edge, of a material having a high thermal conductivity, especially brass, nickel and/or copper or an alloy of at least two of those materials.

An advantageous development of the laser ignition device according to the present invention provides that the aperture is constructed as a separate component and is fastened to a further part of the housing of the laser spark plug, especially to a shoulder. It is preferred to ensure good conduction of heat out of the aperture, which may be achieved by virtue of the joint between aperture and a further part of the housing having good thermal conductivity, especially as a result of soldering over a large surface area (at least 10 mm$^2$, especially at least 20 mm$^2$) and/or by dispensing with welded connections, for example by using a compression joint. Alternatively or in addition, the aperture may also be screwed to the further part of the housing a screw thread, it being preferred that a screwed connection be provided with the use of a fine thread (thread pitch ≤0.5 mm, especially ≤0.3 mm).

It is possible in principle to generate with the laser spark plug an ignition spark in the interior of the aperture. However, the generation of an ignition spark in a region disposed in front of the aperture on the combustion chamber side, especially in a combustion chamber or a prechamber, is more advantageous since in that way it is possible to avoid quenching losses upon ignition. Preferably, in this case, an ignition spark is generated at least 1 mm, preferably at least 2 mm, outside the aperture. As upper limits for the distance between ignition spark and exit face of the aperture there come into consideration, in addition or alternatively, 30 mm, 10 mm and 5 mm, since otherwise the exit cross-section of the aperture would have to be excessively large and adequate focusing of the laser radiation would be made more difficult. The position of a focus of the laser radiation generated or shaped by the laser spark plug may, in particular, be regarded as the position of the ignition spark.

The scope of the present invention also includes in principle, as a special case of a combustion chamber, a prechamber that is or may be fixed to the laser spark plug, especially a prechamber whose volume is less than 10 cm$^3$ and that has at least one overflow channel whose cross-section is less than 5 mm$^2$.

BRIEF DESCRIPTION OF THE DRAWINGS

FIGS. 2 through 21c show exemplary embodiments of laser spark plugs according to the invention.

DETAILED DESCRIPTION

Figure 1A:
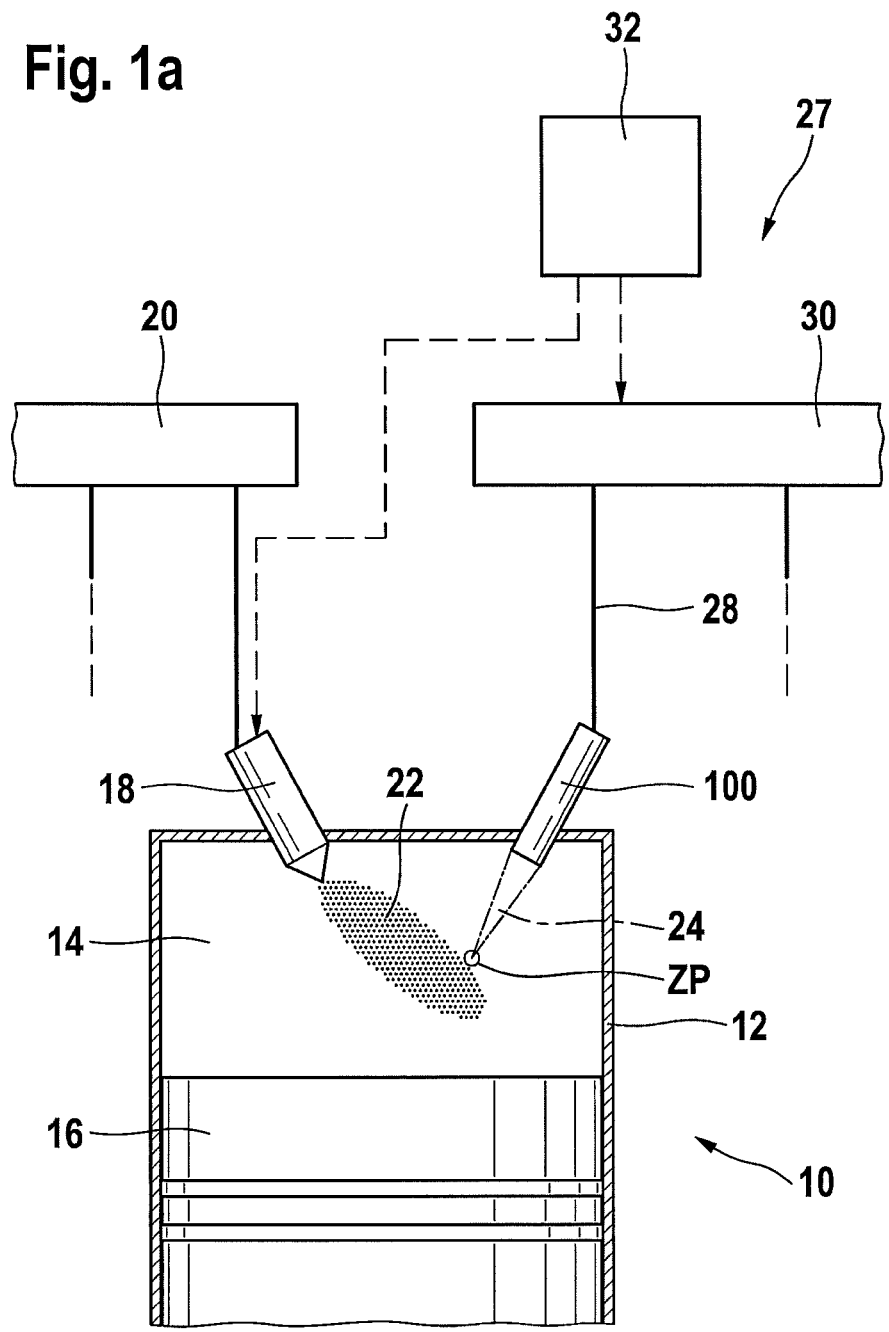
FIG. 1a shows a schematic illustration of an internal combustion engine having a laser ignition device.

An internal combustion engine bears reference numeral 10 overall in FIG. 1a. It may be used to drive a motor vehicle, not shown. Internal combustion engine 10 includes a plurality of cylinders, only one of which is shown in FIG. 1, bearing reference numeral 12. A combustion chamber 14 of cylinder 12 is delimited by a piston 16. Fuel or previously mixed fuel/air mixture passes into combustion chamber 14 through an injector 18 which is connected to a fuel pressure reservoir 20 also referred to as a rail.

Fuel 22 injected into combustion chamber 14 or previously mixed fuel/air mixture is ignited by laser radiation 24 which is radiated into combustion chamber 14 from an ignition device 27 including a laser spark plug 100. For that purpose, laser spark plug 100 is supplied via a light-guiding device 28 with light that may, in particular, be pumping light provided by a light source 30. It is also possible to provide that light intended for the ignition is provided directly by light source 30. Light source 30 is controlled by a control unit 32 which also activates injector 18.

Figure 1B:
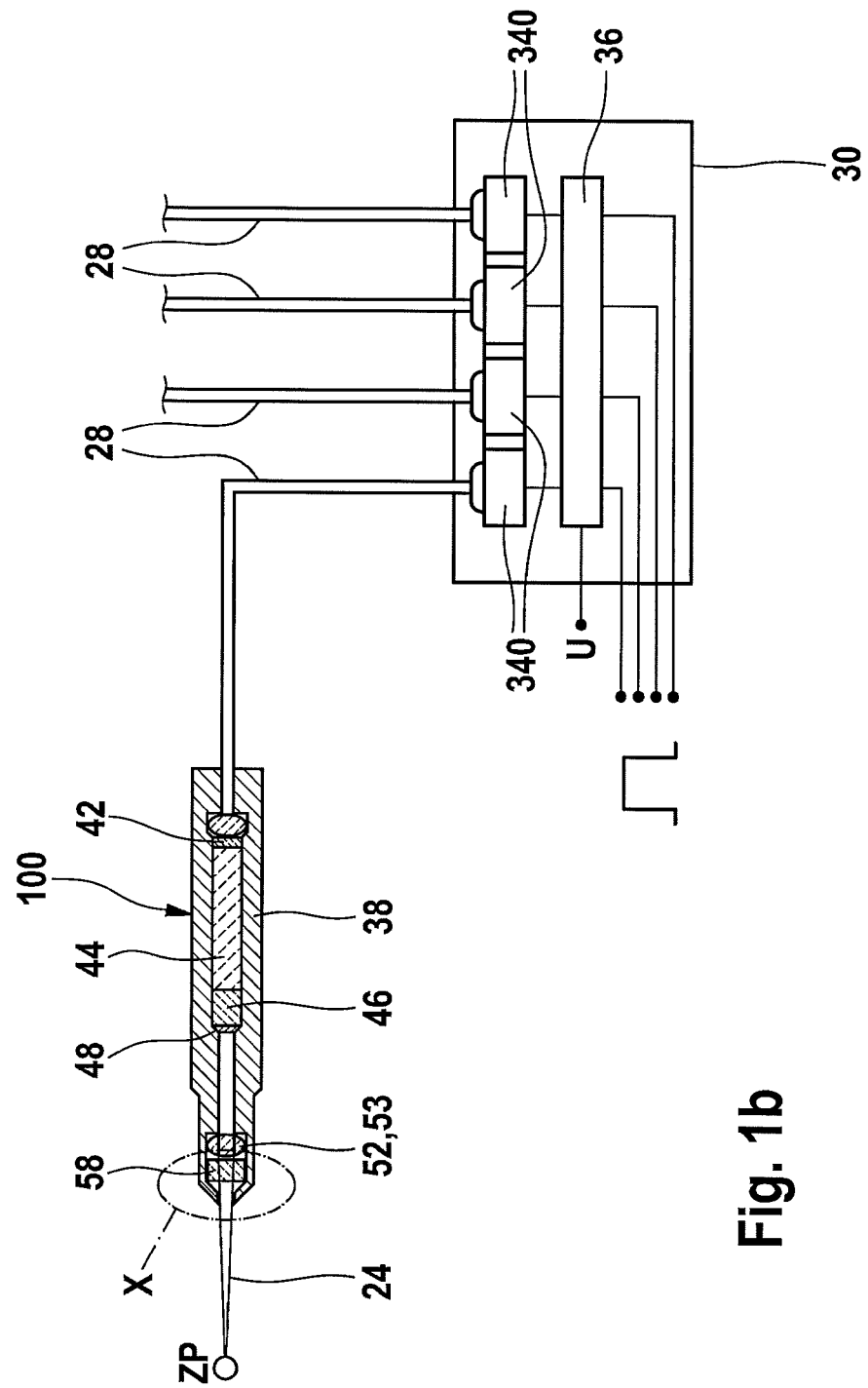
FIG. 1b shows a schematic illustration of the laser ignition device of FIG. 1.

As is apparent from FIG. 1b, light source 30 feeds a plurality of light-guiding devices 28 for various laser spark plugs 100 which are each assigned to a respective cylinder 12 of internal combustion engine 10. For that purpose, light source 30 has a plurality of individual laser light sources 340 which are connected to a pulse current supply 36. The presence of the plurality of individual laser light sources 340 implements, as it were, a "static" distribution of light, in particular pumping light, so that no optical distributors or the like are required between light source 30 and laser spark plugs 100. Alternatively, light source 30 may also have only one laser light source 340. In particular, exactly one light source 30 and/or exactly one laser light source 340 is assigned to each laser spark plug 100.

Laser spark plug 100 has, for example, a laser-active solid body 44 with a passive Q-switch 46 which, together with an input mirror 42 and an output mirror 48, forms an optical resonator. Optionally, further optical components, especially lenses, for example for shaping the radiation fed to laser spark plug 100 or for widening of radiation, may be provided.

When acted upon by light, especially pumping light, generated by light source 30, laser spark plug 100 generates laser radiation 24 in a manner known per se which is focused by a focusing lens system 52 onto an ignition point ZP situated in combustion chamber 14 (FIG. 1a). The components present in housing 38 of laser spark plug 100 are separated from combustion chamber 14 by a combustion chamber window 58.

FIGS. 2 through 21a show the detail X from FIG. 1b—that end 381 of housing 38 of laser spark plug 100 which is toward combustion chamber 14—on a greatly enlarged scale in partial longitudinal section. It becomes clear from this greatly enlarged illustration that combustion chamber window 58 is connected to housing 38 in a sealing manner. The seal between housing 38 and combustion chamber window 58 may be made in the region of reference numeral 60 in the form of a positive or non-positive connection.

Housing 38 may, as in these examples, be in two parts. It includes an inner sleeve 62 and an outer sleeve 64. Outer sleeve 64 has a shoulder 66 at an end toward combustion chamber 14 (see FIG. 1a). In particular, in the case of the non-positive connection, shoulder 66 serves to press combustion chamber window 58 against inner sleeve 62 and thereby increase the impermeability in the region of connection 60. Sealing elements, for example sealing rings, especially steel sealing rings, preferably copper-coated steel sealing rings, may also be used and, in particular, are advantageous with regard to thermal expansion compensation between the window material and the surrounding material.

In this example, outer sleeve 64 is provided with an internal screw thread which cooperates with a corresponding external screw thread of inner sleeve 62. That screw thread, composed of internal screw thread and external screw thread, is denoted in its entirety by reference numeral 68. By tightening outer sleeve 64 and inner sleeve 62 to each other, a further sealing face 72 is produced between shoulder 66 and combustion chamber window 58.

In addition to the forms of sealing shown in these examples, other forms of sealing of combustion chamber window 58 are also possible in principle, for example those in which, as described in German Patent Application No. DE 10 2009 000 540 A1, an integral seal is provided between the combustion chamber window and a surrounding material.

In the interior of housing 38, there is situated on the opposite side of combustion chamber window 58 from combustion chamber 14 a focusing lens system 52 (see FIGS. 1a and 1b) which focuses laser radiation 24 generated in laser spark plug 100 or laser radiation 24 fed into laser spark plug 100 onto ignition point ZP which, in this example, corresponds to the focal point of focusing lens system 52. At the end 381 of housing 38 on the combustion chamber side, an aperture 74 is provided for the passage of laser radiation 24 into combustion chamber 14.

Laser spark plug 100 illustrated in FIG. 2 has a housing 38 the portion of which disposed on the combustion chamber side of combustion chamber window 58 is configured in the form of a sleeve and forms an aperture 74 according to the present invention. Internal contour 71 of aperture 74 has, for example, the shape of a cylinder wall whose height corresponds to the length L of aperture 74. Length L is measured in the longitudinal direction of the laser spark plug starting, for example, at combustion chamber window 58, and in this example measures 13 mm.

In this example, it is further provided that aperture 74 consists of a material having a thermal conductivity of 60 W/(m*K) or more or even having a thermal conductivity of 80 W/(m*K) or more, for example brass, nickel or copper or an alloy having at least one of those materials. For that purpose, in this example, the entire housing 38 is fabricated from that material. Alternatively, it would also be possible to provide that material only in the region of that end 381 of housing 38 which is on the combustion chamber side. Providing the material only in the interior of the aperture, surrounded by another material whose thermal conductivity may be lower, for example a high-alloy steel, is also possible. Such a variant is shown in FIG. 3 and has, in the interior of aperture 74, an insert 80 which consists, for example, of copper and with which a rapid removal of heat from the region of aperture 74 to a region of housing 38 further away from combustion chamber 14 is possible. In a further alternative, in place of insert 80, cooling channels 81 are provided in the interior of aperture 74, as shown in FIG. 4. Those cooling channels 81 make it possible to take heat away from the region of aperture 74 to a region of housing 38 further away from combustion chamber 14, for example by circulation of water or another cooling medium.

FIG. 5 shows an example of a laser spark plug that differs from those so far illustrated in the respect that a gap 82 is disposed in front of combustion chamber window 58 on the combustion chamber side. In this example, gap 82 is axially delimited on the side toward combustion chamber 14 by aperture 74, on the side remote from combustion chamber 14 by combustion chamber window 58, and toward the outside by aperture 74. Toward the inside, gap 82 communicates via the interior of aperture 74 with a region lying in front of aperture 74, for example a combustion chamber 14. Gap 82 has in this example the base face of a ring having an outside diameter $D_{SA}$ of 15 mm and an inside diameter $D_{SI}$ of 6 mm, so that the gap cross-section $Q_S$ is 148 mm². The gap cross-section $Q_S$ is accordingly a multiple of the entry cross-section $Q_{BE}$, which is 28 mm², with an entry diameter $D_{BE}$ of aperture 74 of 6 mm. The height $H_S$ of gap 82 is in this example 0.15 mm.

In another example that is particularly relevant for laser spark plugs intended for use in internal combustion engines whose lubrication makes use of low-additive oils or whose lubrication make use of non-additive oils, the height of the gap is 2 mm and the gap cross-section $Q_S$ is only 20% of the entry cross-section $Q_{BE}$ of aperture 74, namely 0.56 mm².

Figure 6:
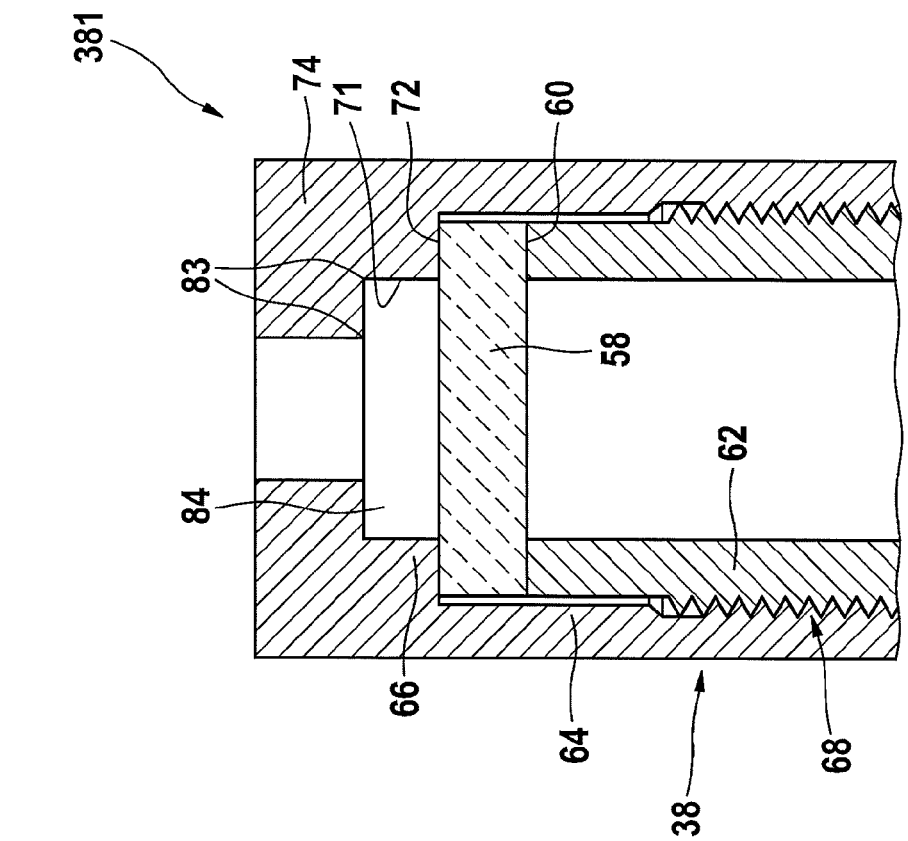
Figure 7:
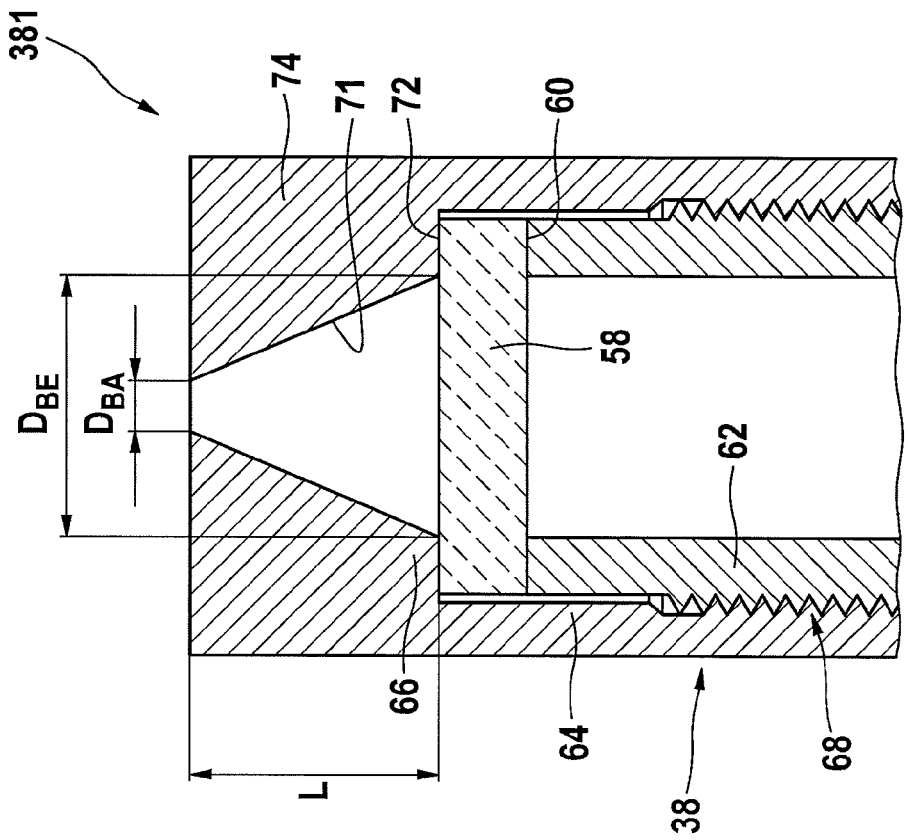
Figure 12:
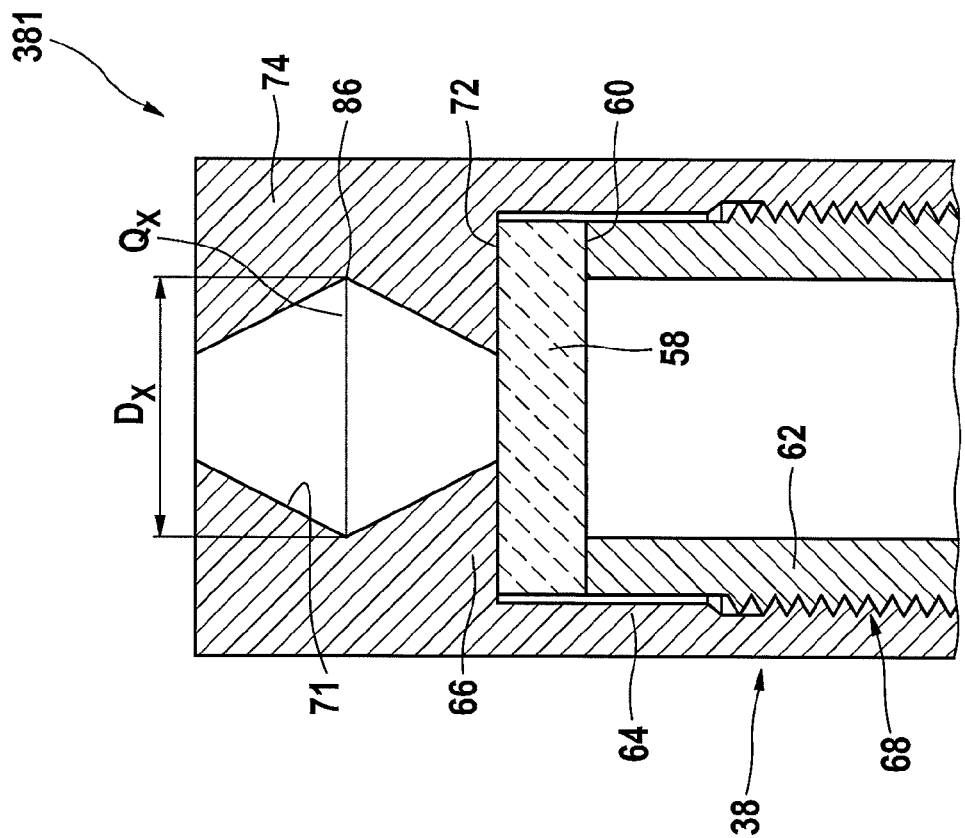

FIG. 6 shows a further example of a laser spark plug 100, which differs from those described above in the respect that aperture 74 has a particularly small exit cross-section $Q_{BA}$ which in this example is 3 mm² with an exit diameter $D_{BA}$ of the aperture of 2 mm. Length L of aperture 74 is 12 mm in this example, thus giving for the ratio $L/(4Q_{BA}/\pi)^{1/2}$ the value 6.

FIGS. 7 through 10 each show a further example of a laser spark plug, which differs from those described above in the respect that the internal contour of aperture 74 has, in a region that is spaced both from the end of aperture 74 toward the combustion chamber and from the end of aperture 74 remote from the combustion chamber, at least one edge 83, especially a plurality of edges 83. Laser spark plug 100 illustrated in FIG. 7 has an aperture 74 having in a central region two edges 83, an internal edge and an external edge, which together form a right-angled step 84. FIG. 8 illustrates a laser spark plug 100 having a plurality of edges 83 and right-angled steps 84 formed therefrom, where the number of steps 84 actually depicted is to be regarded as being also representative, for example, of 3, 7 or 8 steps disposed, in particular, in a central region of aperture 74. Steps 84 that are not right-angled are also possible. In addition to steps 84 shown above, at which aperture 74 tapers toward its end that is toward combustion chamber 14, steps 84 at which aperture 74 tapers toward its end that is remote from combustion chamber 14 are also possible. FIG. 9 shows an example in which steps 84 at which aperture 74 tapers toward its end that is toward combustion chamber 14 are disposed upstream on the combustion chamber side.

FIG. 10 shows a further example of a laser spark plug 100 having an aperture 74 whose internal contour 71 has an edge 83 extending all the way around.

FIGS. 11 through 15 each show a further example of a laser spark plug 100 having an aperture 74, with the special feature that the internal contour 71 of aperture 74 has, in a region that is spaced both from the end of aperture 74 toward combustion chamber 14 and from the end of aperture 74 remote from combustion chamber 14, an extremal cross-section $Q_X$.

Laser spark plug 100 illustrated in FIG. 11 has an aperture 74 having, in a central region, a sharp-edged constriction 85. In the region of constriction 85, diameter $D_X$ and hence the cross-section of the aperture $Q_X$ are at a minimum, namely approximately half or a quarter as large as each of the entry and the exit cross-section $Q_{BE}$, $Q_{BA}$ of the aperture. Above and below sharp-edged constriction 85, internal contour 71 of aperture 74 has in this example the shape of the lateral surfaces of straight circular conical frusta. Alternatively, it is also possible to give a constriction 85 a rounded configuration, see FIG. 12.

Figure 13:
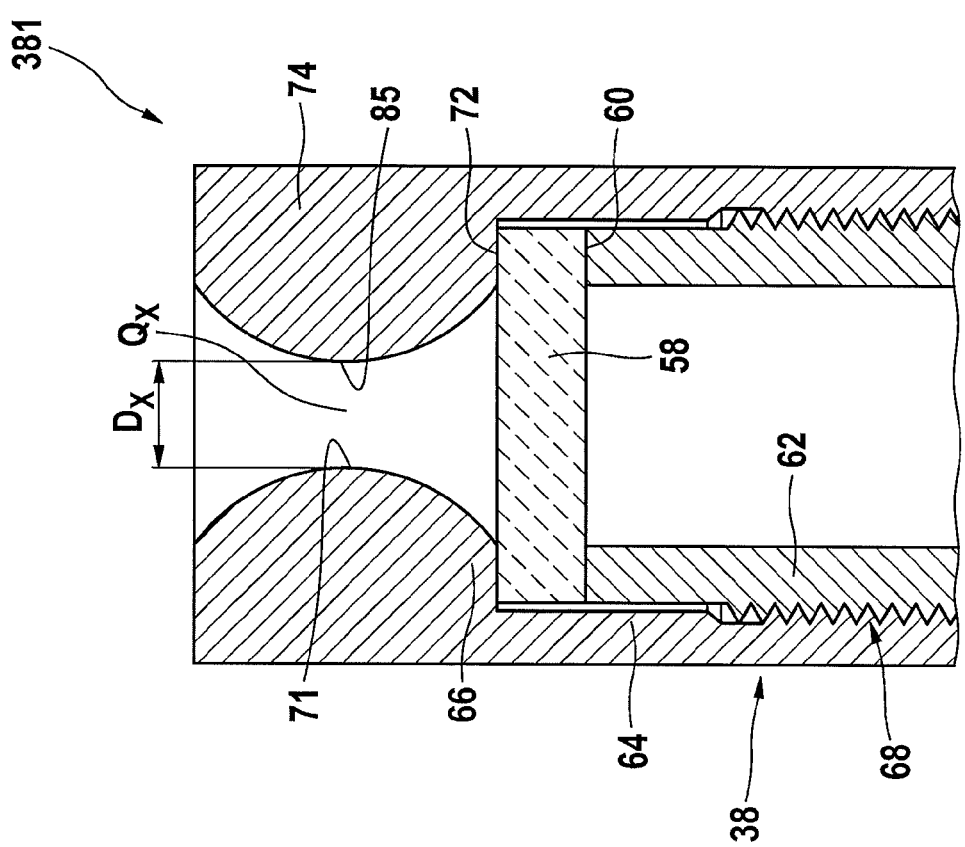

Laser spark plug 100 illustrated in FIG. 13 has an aperture 74 having, in a central region, a sharp-edged protrusion 86. In the region of protrusion 86, the diameter $D_X$ and hence the cross-section of the aperture $Q_X$ is at a maximum, namely approximately twice to four times as large as each of the entry and the exit cross-section $Q_{BE}$, $Q_{BA}$ of the aperture. Above and below sharp-edged protrusion 86, internal contour 71 of aperture 74 has in this example the shape of the lateral surfaces of straight circular conical frusta. Alternatively, it is also possible to give a protrusion 86 a rounded configuration, see FIG. 14. FIG. 15 shows a further variant, in which aperture 74 has a relief groove 87. In this example, the relief groove is in the form of an internal relief groove and is right-angled and has a maximum cross-section of the aperture $Q_X$ that is approximately twice to four times as large as each of the entry and the exit cross-section $Q_{BE}$, $Q_{BA}$ of the aperture.

Figure 17:
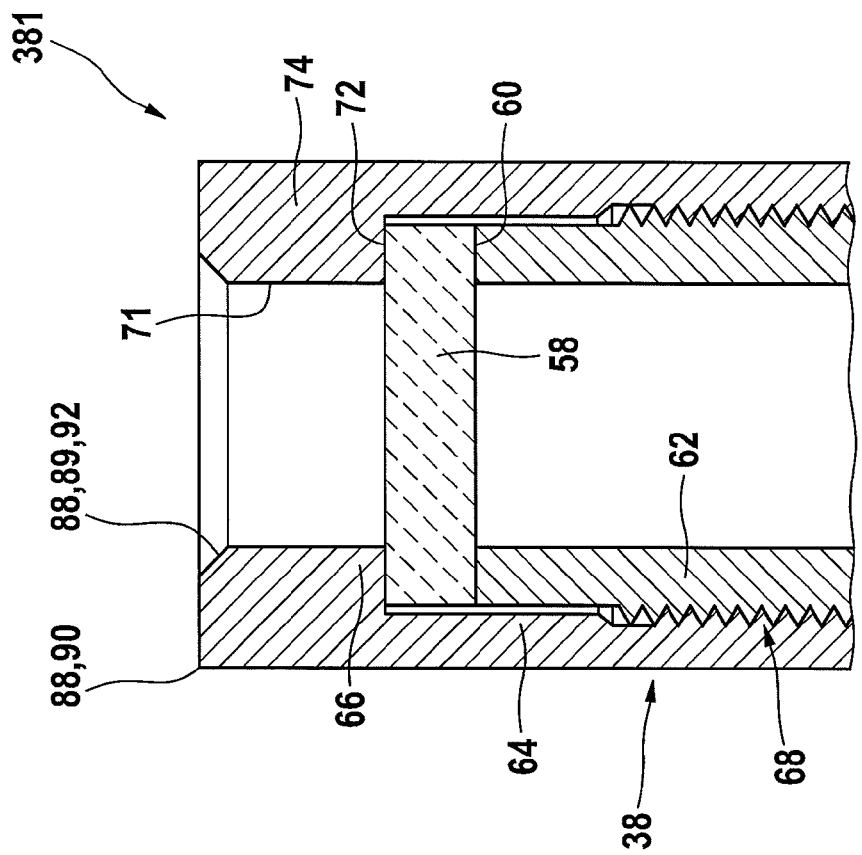
Figure 16:
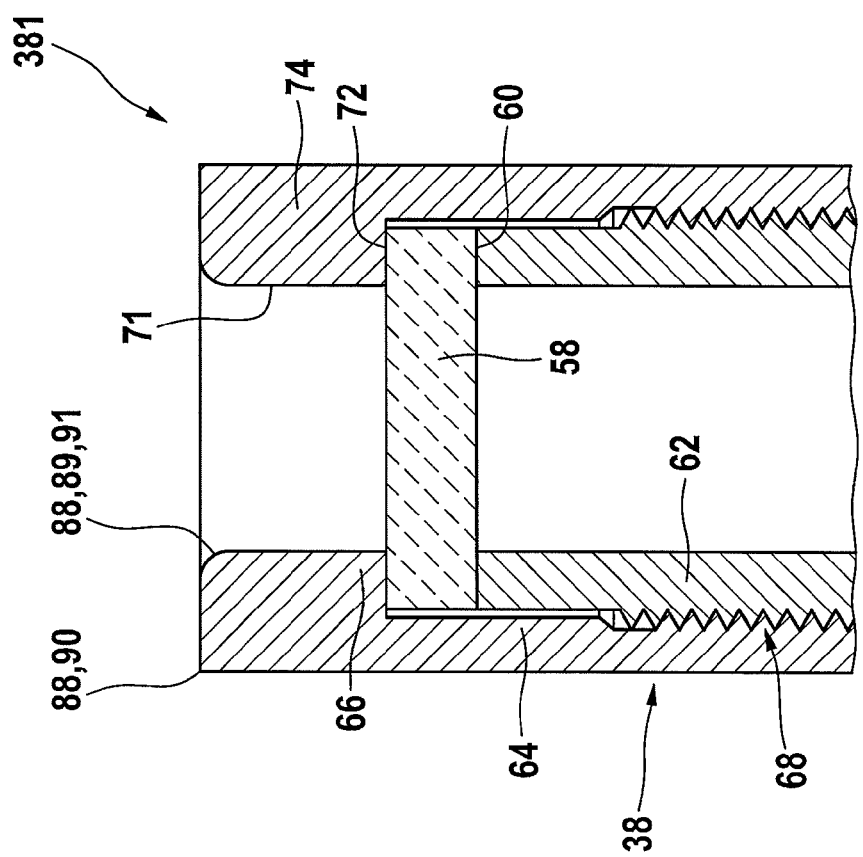

FIGS. 16 and 17 each show a further example of a laser spark plug 100 having an aperture 74, with the special feature that aperture 74 has, on the side toward combustion chamber 14, at least one external edge 88 whose contour deviates inward in comparison with a sharp-edged external edge. Laser spark plug 100 illustrated in FIG. 16 has an aperture 74 with a sleeve-shaped basic shape, the inner edge 89 of the sleeve, lying on the combustion chamber side, having a rounding 91. In this example, the rounding radius is 0.5 mm. Rounding 91 of outer edge 90 of the sleeve, lying on the combustion chamber side, is also possible in addition or as an alternative, for example with a rounding radius of 0.5 mm. Small and/or larger rounding radii are also possible in principle. Laser spark plug 100 illustrated in FIG. 17 has an aperture 74 with a sleeve-shaped basic shape, the inner edge 89 of the sleeve, lying on the combustion chamber side, having a chamfer 92. Chamfer 92 (length and width) is in this example 0.5 mm, and the chamfer angle is 45°. Chamfering 92 of outer edge 90 of the sleeve, lying on the combustion chamber side, is also possible in addition or as an alternative, for example with a length and width of 0.5 mm each. Small and/or larger chamfers 92 are also possible in principle. It will be appreciated that, apart from external edges 88 shown in FIGS. 16 and 17, further external edges 88 may be implemented, the contour of which deviates inward in comparison with a sharp-edged external edge, for example external edges having an exactly or approximately elliptical, parabolic or hyperbolic shape or having an irregular shape. Combinations of chamfers 92 and roundings 91 are also conceivable.

Figure 18:
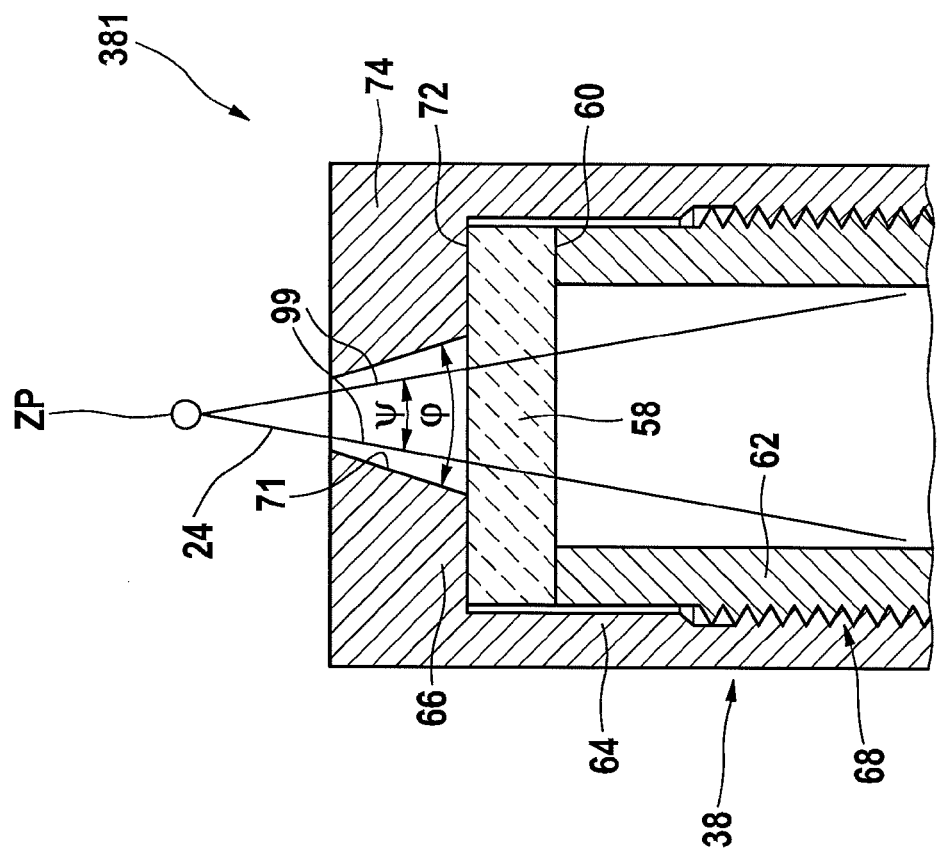
Figure 19:
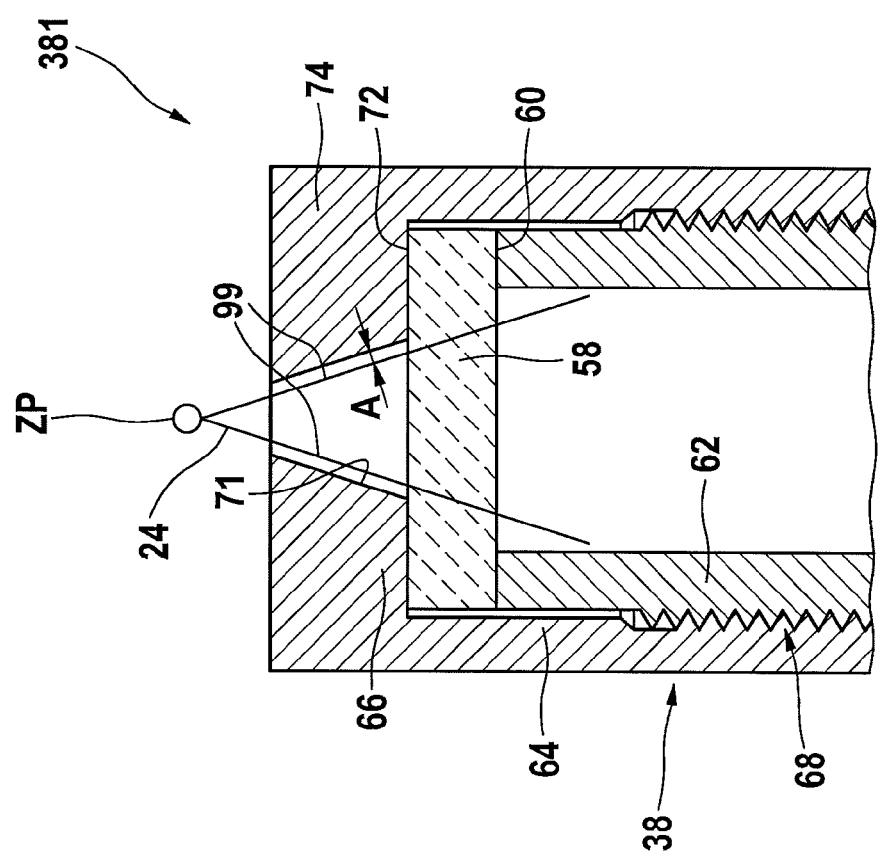

FIGS. 18 and 19 each illustrate a further example of a laser spark plug 100 which has an aperture 74 and has focusing element 53, in particular a focusing lens system 52, for determining a beam shape of laser radiation 24 passing through aperture 74 (see FIG. 1b). Laser spark plugs 100 proposed in these examples have the special feature that the shape of aperture 74 is advantageously selected with regard to the shape of laser radiation 24 passing through it. The shape of laser radiation 24 is indicated in these Figures by cone envelope lines 99 which intersect approximately in ignition point ZP. Within the context of this invention, information regarding the shape of laser radiation 24 is understood as being in accordance with or based on the DIN EN ISO 11145 standard.

Laser spark plug 100 illustrated in FIG. 18 has an aperture 74 that has, along its entire internal contour 71, a spacing A of approximately 0.5 mm from laser radiation 24 passing through it. Laser spark plug 100 illustrated moreover has the characteristic that 88% of laser radiation 24 transmitted through combustion chamber window 58 passes through aperture 74 as focusable laser radiation 24, whereas the remainder of laser radiation 24 undergoes deflection or absorption along internal contour 71 of aperture 74 and is not available for focusing.

Laser spark plug 100 illustrated in FIG. 19 has an aperture 74 whose internal contour 71 has the shape of a straight circular conical frustum whose opening angle $\phi$ is 45°. Laser radiation 24 passing through the aperture is in this example focused in such a manner that the beam divergence angle $\psi$ (far-field divergence) is 30°.

FIGS. 20 and 21a to 21c each illustrate an example of a laser spark plug 100 having an aperture 74 for the passage of laser radiation 24 into a prechamber 110 disposed at the end of housing 38 on the combustion chamber side. An overflow channel 120 is provided for the fluid connection between internal space 111 of prechamber 110 and the combustion chamber.

Figure 20:
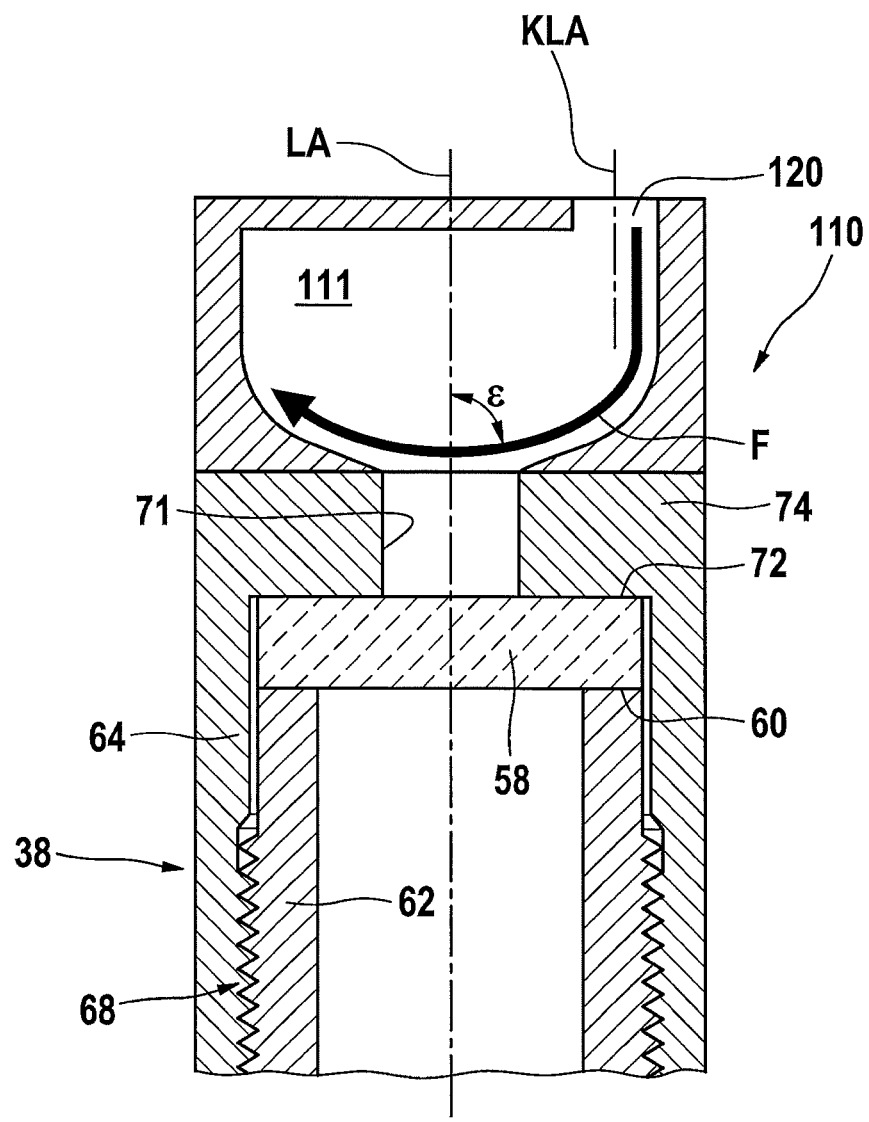

In the case of the example illustrated in FIG. 20, longitudinal axis KLA of overflow channel 120 is offset off-center in relation to longitudinal axis LA of laser spark plug 100. Longitudinal axis KLA of overflow bore 120 and longitudinal axis LA of laser spark plug 100 are parallel to each other in this example, but may alternatively be at an angle to each other in the radial and/or in the tangential direction. When a fluid F flows in, a vortex forms inside prechamber 110 in such a way that the fluid flow along the exit orifice of aperture 74 is largely parallel to the exit orifice of aperture 74. Fluid that nevertheless enters the interior of aperture 74 accordingly enters aperture 74 at an angle $\epsilon$ which, measured with respect to longitudinal axis LA of the laser spark plug, is almost 90°, especially always at least 75°. The fluid flow that develops in the interior of aperture 74 represents, in particular, a tumbling flow. In this example, length L of the aperture is 5 mm and exit diameter $D_{AE}$ of the aperture is 6 mm. Accordingly, the interaction of angle $\epsilon$ at which fluid F enters the interior of aperture 74, length L and exit diameter $D_{AE}$ of the aperture provide in this example that fluid flow F does not impinge on combustion chamber window 58 directly but only after deflections at internal contour 71 of aperture 74.

Further configurations of laser spark plugs 100 having prechambers 110 whose one overflow channel 120 is so disposed and configured that, when a fluid flows into internal space 111 of prechamber 110 through overflow channel 120, a fluid flow F is obtained that enters the interior of aperture 74 at a minimum angle $\epsilon$, in particular measured with respect to the longitudinal axis of the laser spark plug, of 45°, 60° or 75° are possible and, in particular, provide for a plurality of overflow channels 120 to be provided. In addition or as an alternative, it is also possible for additional elements (not shown) to be provided, through which a flushing gas may be blown into the prechamber. In particular, it is provided that those elements for blowing in flushing gas cooperate with overflow channel 120 in a manner such that altogether a fluid flow develops in such a way that, when a fluid flows into internal space 111 of prechamber 110 through overflow channel 120, a fluid flow F is obtained that enters the interior of aperture 74 at a minimum angle ε, in particular measured with respect to the longitudinal axis of the laser spark plug, of 45°, 60° or 75°.

Where not explicitly excluded, the configuration of a prechamber 111 of the described kind shown in FIG. 20 and the provision of a minimum angle ε also come into consideration in the other embodiments and examples of the present invention.

FIG. 21a shows a further example of a laser spark plug 100, as a partial longitudinal section along longitudinal axis LA of laser spark plug 100, FIG. 21b shows a plan view in direction B of FIG. 21a, and FIG. 21c shows a section along line C-C of FIG. 21b. For the fluid connection between internal space 111 of prechamber 110 and the combustion chamber, this laser spark plug 100 has five overflow channels 120 which are disposed symmetrically, offset from one another by 72°. Longitudinal axes KLA of overflow bores 120 are inclined both in the radial and in the tangential direction in such a way that longitudinal axes KLA of overflow bores 120 form in plan view of the laser spark plug (FIG. 21b) a regular pentagon. Owing to the arrangement and orientation of overflow bores 120, when a fluid F flows into prechamber 110 a vortex forms whose vortex axis WB coincides, in the interior of prechamber 110 and in the region of aperture 74, with longitudinal axis LA of laser spark plug 100. The flow conditions in the region of aperture 74 have the result that, in particular, heavy particles, which leave the flow tangentially in the region of a vortex, meet internal contour 71 of aperture 74 and do not penetrate as far as combustion chamber window 58.

The fluid flow that develops in the interior of aperture 74 represents, in particular, a swirling flow. In this example, length L of the aperture is 5 mm and exit diameter $D_{BE}$ of the aperture is 6 mm. Accordingly, the interaction of the angle ν at which the vortex axis WB is tilted with respect to longitudinal axis LA of the laser spark plug (here 0°), length L and exit diameter $D_{AE}$ of aperture 74 provides in this example that the mentioned particles do not meet combustion chamber window 58 when they leave the flow in a tangential direction. That effect is also obtained at least partially for $\tan \nu \leq L/D_{BE}$, especially for $n^* \tan \nu \leq L/D_{BE}$; n=2, 3, 4.

It is further possible for additional elements (not shown) to be provided, through which a flushing gas may be blown into prechamber 110. In particular, it is provided that those elements for blowing in flushing gas cooperate with an overflow channel 120 or a plurality of overflow channels 120 in a manner such that altogether a fluid flow develops in such a way that, when a fluid flows into internal space 111 of prechamber 110 through overflow channel 120 or the overflow channels, a fluid flow is obtained that has a vortex rotating about a vortex axis WB that has a component in the direction of longitudinal axis LA of laser spark plug 100, especially parallel to or coaxial with longitudinal axis LA of laser spark plug 100.

Although for apertures 74 shown in FIGS. 2 through 21c an axially symmetrical shape, as drawn therein, is on the one hand preferred, deviations from an axial symmetry may also be advantageously provided.

The present invention is not limited to the foregoing embodiments and examples nor to the embodiments and examples explicitly described nor to the embodiments and examples explicitly illustrated in the Figures, but rather further embodiments and examples are provided in a manner that is reproducible for the person skilled in the art by combinations of the features described in connection with the individual embodiments and examples. Of those combinations, in particular those whose advantageous effect has already been explicitly emphasized in the foregoing are of importance.

In particular, embodiments based on a cooperation of one of the above-disclosed features or, provided that they are not mutually exclusive, more than one of the above-disclosed features from two or more than two of the following groups of features are also advantageous and reproducible for the person skilled in the art: lengths L of aperture 74 that are characterized in the foregoing as being advantageous, selections of the material of aperture 74 that are characterized in the foregoing as being advantageous, configurations of a gap 82 disposed in front of combustion chamber window 58 on the combustion chamber side that are characterized in the foregoing as being advantageous, cross-sections of aperture 74 that are characterized in the foregoing as being advantageous, ratios between lengths L and cross-sectional surface areas Q of aperture 74 that are characterized in the foregoing as being advantageous, features of internal contour 71 of aperture 74, especially edges 83 and extremal cross-sections of aperture 74, that are characterized in the foregoing as being advantageous, features characterized in the foregoing as being advantageous that relate to an advantageous configuration of the shape of aperture 74 in terms of the shape of laser radiation 24 passing through aperture 74, features characterized in the foregoing as being advantageous that relate to the configuration of an external edge 88 of aperture 74, features characterized in the foregoing as being advantageous that relate to the configuration of a prechamber 110, especially of an overflow channel 120.

What is claimed is:

1. A laser spark plug for an internal combustion engine, comprising:
    at least one element for guiding, shaping and/or generating laser radiation;
    a combustion chamber window; and
    a housing,
    wherein the housing has, on an opposite side of the combustion chamber window from the element, an aperture for passage of the laser radiation guided, shaped and/or generated by the element into a prechamber disposed at an end of the housing on a combustion chamber side, at least one overflow channel being provided which makes possible a fluid connection between an internal space of the prechamber and a combustion chamber surrounding the prechamber, the at least one overflow channel being disposed and configured such that, when a fluid flows into the internal space of the prechamber through the overflow channel, a fluid flow is obtained that enters an interior of the aperture at a minimum angle ε of 45°, measured with respect to a longitudinal axis of the laser spark plug.

2. The laser spark plug according to claim 1, wherein the fluid flow enters the interior of the aperture at an angle ε of at least 60°, measured with respect to the longitudinal axis of the laser spark plug.

3. The laser spark plug according to claim 1, wherein the fluid flow enters the interior of the aperture at an angle ε of at least 75°, measured with respect to the longitudinal axis of the laser spark plug.

4. The laser spark plug according to claim 1, wherein, when the fluid flows into the internal space of the prechamber through the overflow channel, the fluid flow is at least largely parallel to an exit orifice of the aperture at least along further parts of the exit orifice of the aperture.

5. The laser spark plug according to claim 1, wherein the at least one overflow channel is disposed such that its longitudinal axis includes in a radial direction with the longitudinal axis of the laser spark plug an angle that is less than approximately 25°.

6. The laser spark plug according to claim 1, wherein the at least one overflow channel is disposed such that its longitudinal axis includes in a radial direction with the longitudinal axis of the laser spark plug an angle that is less than approximately 10°.

7. The laser spark plug according to claim 1, wherein a plurality of overflow channels is provided, longitudinal axes of respective overflow channels that are adjacent to one another including an angle of not more than 20°.

8. The laser spark plug according to claim 1, wherein a plurality of overflow channels is provided, longitudinal axes of respective overflow channels that are adjacent to one another including an angle of not more than 10°.

9. The laser spark plug according to claim 1, further comprising:
additional elements through which a flushing gas may be blown into the prechamber.

10. The laser spark plug according to claim 9, wherein the additional elements are disposed and operable such that, together with the fluid flowing in through the overflow channel, a resultant total flow results that enters the interior of the aperture one of: at an angle of not more than 45°, at an angle of not more than 15°, or at least largely parallel to an exit orifice of the aperture.

11. The laser spark plug according to claim 1, wherein a length of the aperture is 2 mm or more.

12. The laser spark plug according to claim 1, wherein a length of the aperture is 7 mm or more.

13. The laser spark plug according to claim 1, wherein a length of the aperture is 12 mm or more.

14. The laser spark plug according to claim 1, wherein a length of the aperture is 20 mm or less.

15. The laser spark plug according to claim 1, wherein a length of the aperture is 15 mm or less.

16. The laser spark plug according to claim 1, wherein the aperture tapers conically in a direction toward the end thereof that is on the combustion chamber side.

17. The laser spark plug according to claim 1, wherein an exit orifice of the aperture has a cross-section of 78 $mm^2$ or less.

18. The laser spark plug according to claim 1, wherein an exit orifice of the aperture has a cross-section of 19 $mm^2$ or less.

19. The laser spark plug according to claim 1, wherein a gap is provided in front of the combustion chamber window on the combustion chamber side, a height of the gap being 1 mm or less.

20. The laser spark plug according to claim 1, wherein a gap is provided in front of the combustion chamber window on the combustion chamber side, a height of the gap being 0.5 mm or less.

21. The laser spark plug according to claim 1, wherein the aperture has, on a side thereof remote from the combustion chamber window, an orifice cross-section of 78 $mm^2$ or less.

22. The laser spark plug according to claim 1, wherein the aperture has, on a side thereof remote from the combustion chamber window, an orifice cross-section of 7 $mm^2$ or less.

* * * * *